United States Patent
Kim et al.

(10) Patent No.: US 11,025,307 B2
(45) Date of Patent: Jun. 1, 2021

(54) ELECTRONIC DEVICE FOR SENSING LOCATION AND CONTACT OF EXTERNAL OBJECT

(71) Applicant: Samsung Electronics Co., Ltd., Gyeonggi-do (KR)

(72) Inventors: Hoyeon Kim, Gyeonggi-do (KR); Jeongsik Kim, Gyeonggi-do (KR); Sungjun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 16/678,083

(22) Filed: Nov. 8, 2019

(65) Prior Publication Data
US 2020/0186203 A1    Jun. 11, 2020

(30) Foreign Application Priority Data
Dec. 10, 2018 (KR) .................. 10-2018-0158295

(51) Int. Cl.
*H04B 7/024* (2017.01)
*H04L 5/00* (2006.01)
*H04J 11/00* (2006.01)

(52) U.S. Cl.
CPC .......... *H04B 7/024* (2013.01); *H04J 11/0053* (2013.01); *H04L 5/0035* (2013.01)

(58) Field of Classification Search
CPC .... H04B 7/0814; H04B 7/0608; H04B 7/024; H04J 11/0053; H04J 11/00; H04L 5/0035
See application file for complete search history.

(56) References Cited

U.S. PATENT DOCUMENTS

| | | | |
|---|---|---|---|
| 8,934,903 B2 | 1/2015 | Kwun et al. | |
| 9,306,648 B2 | 4/2016 | Sagong et al. | |
| 10,447,263 B2 | 10/2019 | Yang et al. | |
| 2006/0281423 A1* | 12/2006 | Caimi | H01Q 9/045 455/129 |

(Continued)

FOREIGN PATENT DOCUMENTS

| | | |
|---|---|---|
| KR | 10-1543016 B1 | 8/2015 |
| KR | 10-1839808 B1 | 4/2018 |
| WO | 2018/034518 A1 | 2/2018 |

OTHER PUBLICATIONS

International Search Report dated Feb. 28, 2020.

*Primary Examiner* — Syed Ali
(74) *Attorney, Agent, or Firm* — Cha & Reiter, LLC.

(57) ABSTRACT

An electronic device includes a housing, a first antenna included in a first region of the housing, a second antenna included in a second region of the housing, an antenna structure that is disposed within the housing, a coupler that obtains an impedance of each of the antennas and the antenna structure, a memory that stores a table in which the impedances of each of the antennas and the antenna structure are matched to a location or a contact of an external object, and a processor, and the processor obtains the impedances of each of the antennas and the antenna structure from the coupler when the external object approaches the electronic device, obtains the location or the contact of the external object based on the obtained impedances and the table, and transceives a signal through the antenna structure in a direction where the external object is absent.

12 Claims, 20 Drawing Sheets

(56) References Cited

U.S. PATENT DOCUMENTS

| | | | |
|---|---|---|---|
| 2007/0222697 A1* | 9/2007 | Caimi | H01Q 1/50 |
| | | | 343/861 |
| 2011/0250926 A1* | 10/2011 | Wietfeldt | H01Q 9/14 |
| | | | 455/525 |
| 2012/0329407 A1* | 12/2012 | Rousu | H01Q 3/2605 |
| | | | 455/90.2 |
| 2013/0053079 A1 | 2/2013 | Kwun et al. | |
| 2013/0257659 A1* | 10/2013 | Darnell | H05K 1/181 |
| | | | 343/702 |
| 2014/0334565 A1* | 11/2014 | Tzanidis | H01Q 21/20 |
| | | | 375/267 |
| 2015/0195026 A1 | 7/2015 | Sagong et al. | |
| 2016/0308626 A1 | 10/2016 | Mow et al. | |
| 2017/0230124 A1 | 8/2017 | Mow et al. | |
| 2017/0359113 A1 | 12/2017 | Lee et al. | |
| 2018/0034134 A1* | 2/2018 | Dalmia | H01Q 19/30 |
| 2018/0034148 A1 | 2/2018 | Nam et al. | |
| 2018/0062684 A1 | 3/2018 | Kim | |
| 2018/0069301 A1* | 3/2018 | Choi | H01Q 21/28 |
| 2018/0219637 A1 | 8/2018 | Mow et al. | |
| 2020/0044653 A1 | 2/2020 | Yang et al. | |

* cited by examiner

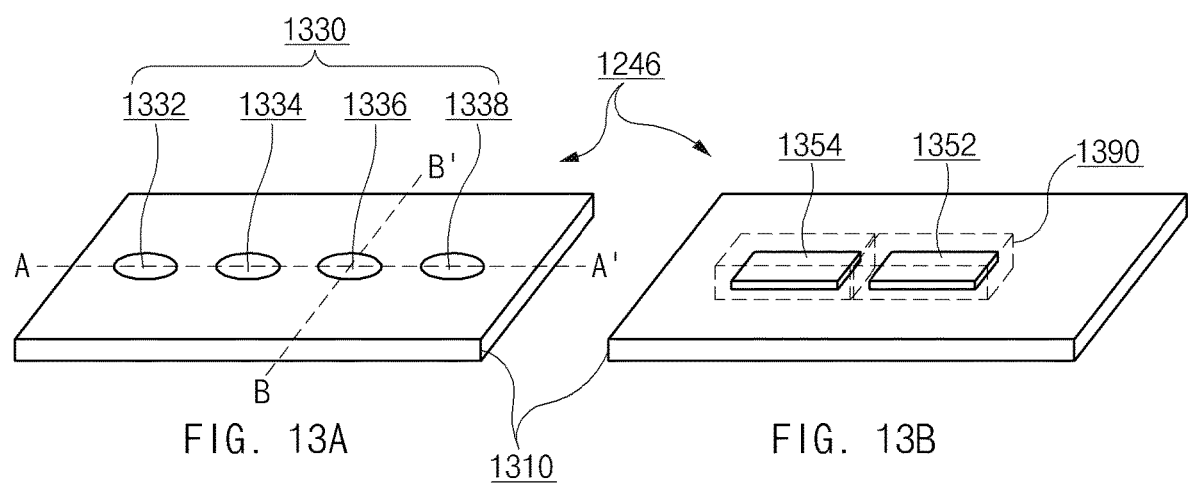
FIG. 13A
FIG. 13B
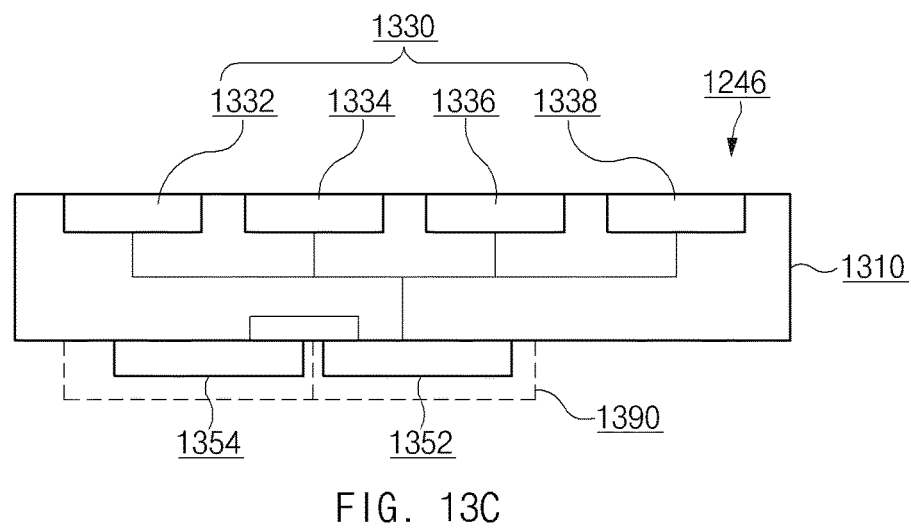
FIG. 13C

ELECTRONIC DEVICE FOR SENSING LOCATION AND CONTACT OF EXTERNAL OBJECT

CROSS-REFERENCE TO RELATED APPLICATION(S)

This application is based on and claims priority under 35 U.S.C. § 119 to Korean Patent Application No. 10-2018-0158295, filed on Dec. 10, 2018, in the Korean Intellectual Property Office, the disclosure of which is incorporated by reference herein its entirety.

BACKGROUND

1. Field

The instant disclosure generally relates to technology for improving radiation performance of an antenna structure of an electronic device by sensing location and contact of an external object approaching the electronic device.

2. Description of Related Art

As electronic devices such as smartphone are popularized, the network traffic associated with these electronic devices has sharply increased. To improve network performance, next-generation mobile communication technology using signals in an ultra-high-frequency band, for example, $5^{th}$ generation (5G) mobile communication technology, is being actively developed. Because the bandwidth available to 5G mobile communication technology is wider, a significant amount of information may be transmitted or received.

The electronic devices may each include an antenna structure for the purpose of making use of the 5G mobile communication technology. Since the antenna structure has a relatively greater effective isotropically radiated power (EIRP), the antenna structure may transmit/receive various kinds of data more effectively.

The above information is presented as background information only to assist with an understanding of the disclosure. No determination has been made, and no assertion is made, as to whether any of the above might be applicable as prior art with regard to the disclosure.

SUMMARY

An electronic device may include a housing and a plurality of antennas implemented at different regions of the housing. The electronic device may sense contact of an external object by using one of the antennas. In the case of using one antenna, whether the external object contacts a specific location (e.g., an edge of the housing) may be sensed, but it may be impossible to sense whether the external object contacts a different location from the specific location. Also, it may be impossible to exactly sense the location of the external object when using one antenna. Accordingly, in the case where the external object contacts the different location or approaches the electronic device, and the radiation direction of the antenna structure is not appropriately changed, the radiation performance of the antenna structure may decrease.

In accordance with an aspect of the disclosure, an electronic device may include a housing, a first antenna included in a first region of the housing, a second antenna included in a second region of the housing, an antenna structure that is disposed within the housing and includes an antenna array, a coupler that obtains an impedance of each of the first antenna, the second antenna, and the antenna structure, a memory that stores a table in which the impedances of each of the first antenna, the second antenna, and the antenna structure are matched to a location or a contact of an external object, and a processor that is electrically connected to the coupler and the memory, and the processor may obtain the impedances of each of the first antenna, the second antenna, and the antenna structure from the coupler when the external object approaches the electronic device, obtain the location or the contact of the external object based on the obtained impedances and the table, and transceive a signal in a specified frequency band through the antenna structure in a direction where the external object is absent.

In accordance with another aspect of the disclosure, an electronic device may include a housing, at least one antenna that is disposed at a portion of the housing, at least one antenna structure that is located within the housing and includes a plurality of antenna elements, a first wireless communication circuitry that is electrically connected with the at least one antenna, a second wireless communication circuitry that is electrically connected with the plurality of antenna elements and forms a directional beam by using the plurality of antenna elements, a processor that is operatively connected with the at least one antenna and the plurality of antenna elements, and a memory that is operatively connected with the processor, and the memory may store instructions that, when executed, cause the processor to measure impedances associated with the at least one antenna and the plurality of antenna elements while the first wireless communication circuitry and the second wireless communication circuitry are used, and to change a direction of the directional beam based at least partially on values of the measured impedances.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 13A to 13C illustrate an embodiment of a structure of a third antenna module described with reference to FIG. 12, for example.

DETAILED DESCRIPTION

Aspects of the disclosure are to address at least the above-mentioned problems and/or disadvantages and to provide at least the advantages described below. Accordingly, an aspect of the disclosure is to provide an electronic device for improved radiation performance of the antenna structure by sensing location and contact of an external object approaching the electronic device.

Figure 1:
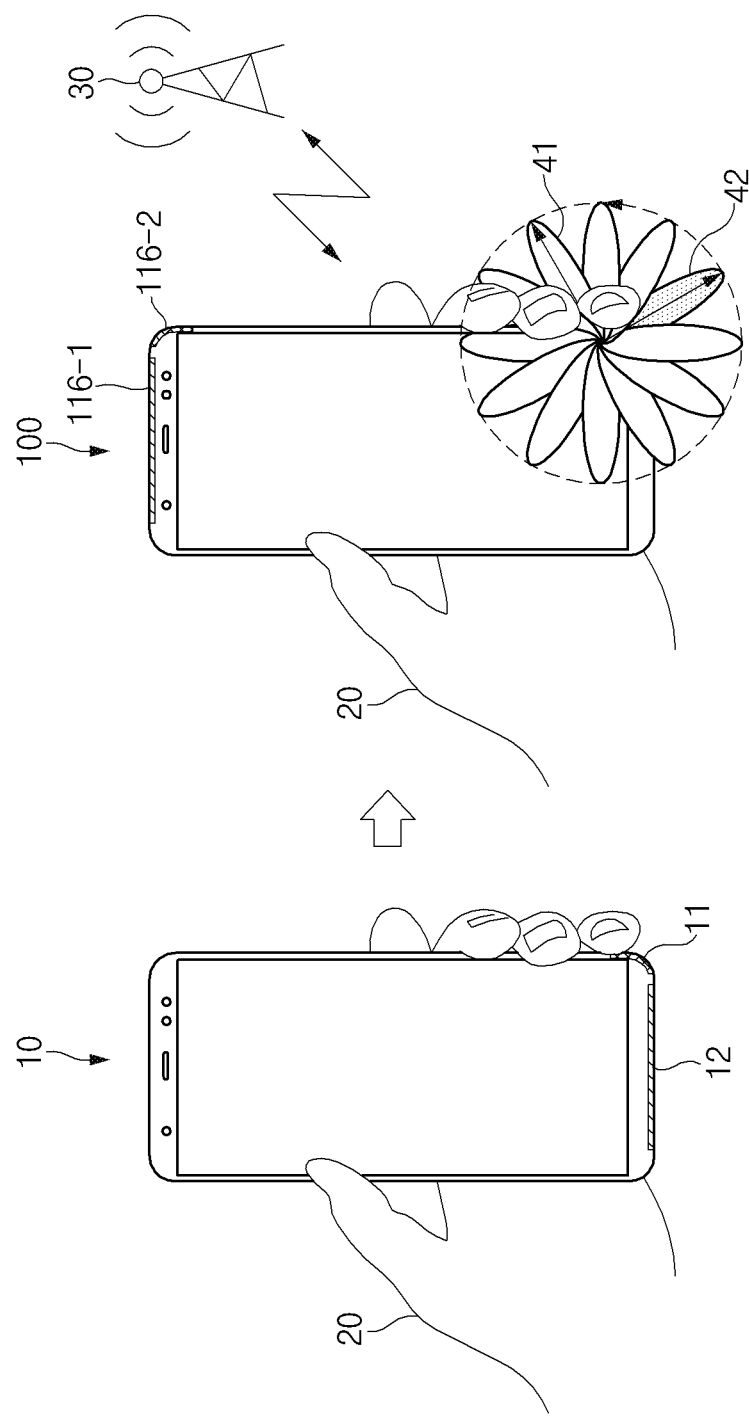
FIG. 1 illustrates a conventional electronic device and an electronic device according to an embodiment of the disclosure.

FIG. 1 illustrates a conventional electronic device and an electronic device according to an embodiment of the disclosure.

Referring to FIG. 1, a conventional electronic device 10 may include a plurality of antennas 11 and 12 and an antenna structure (not illustrated).

The plurality of antennas 11 and 12 may be located in different regions of the electronic device 10. For example, the first antenna 11 may be located in a right bottom region of the electronic device 10, and the second antenna 12 may be located in a center bottom region of the electronic device 10.

The electronic device 10 may sense contact of an external object (e.g., 20 of FIG. 1) by using the first antenna 11. For example, when a user grips the electronic device 10, the electronic device 10 may sense whether his/her hand 20 contacts the first antenna 11, by using the first antenna 11. When a sensing result indicates that the hand 20 of the user contacts the first antenna 11, the electronic device 10 may transmit/receive a signal by using the second antenna 12.

However, when the external object (e.g., 20 of FIG. 1) contacts a different location from the first antenna 11, the sensing function of the electronic device 10 may be deteriorated. For example, when the hand 20 of the user contacts the second antenna 12, the electronic device 10 may sense whether the hand 20 of the user contacts the second antenna 12, but the accuracy of sensing may decrease. Also, when the external object (e.g., 20 of FIG. 1) approaches the electronic device 10, the electronic device 10 may fail to exactly sense the location of the external object (e.g., 20 of FIG. 1). Accordingly, in the case where the external object (e.g., 20 of FIG. 1) contacts a different location from the first antenna 11 or approaches the electronic device 10, it may be impossible to change the radiation direction of the antenna structure because the location of the external object cannot be ascertained. Accordingly, the radiation performance of the antenna structure may decrease.

Figure 2:
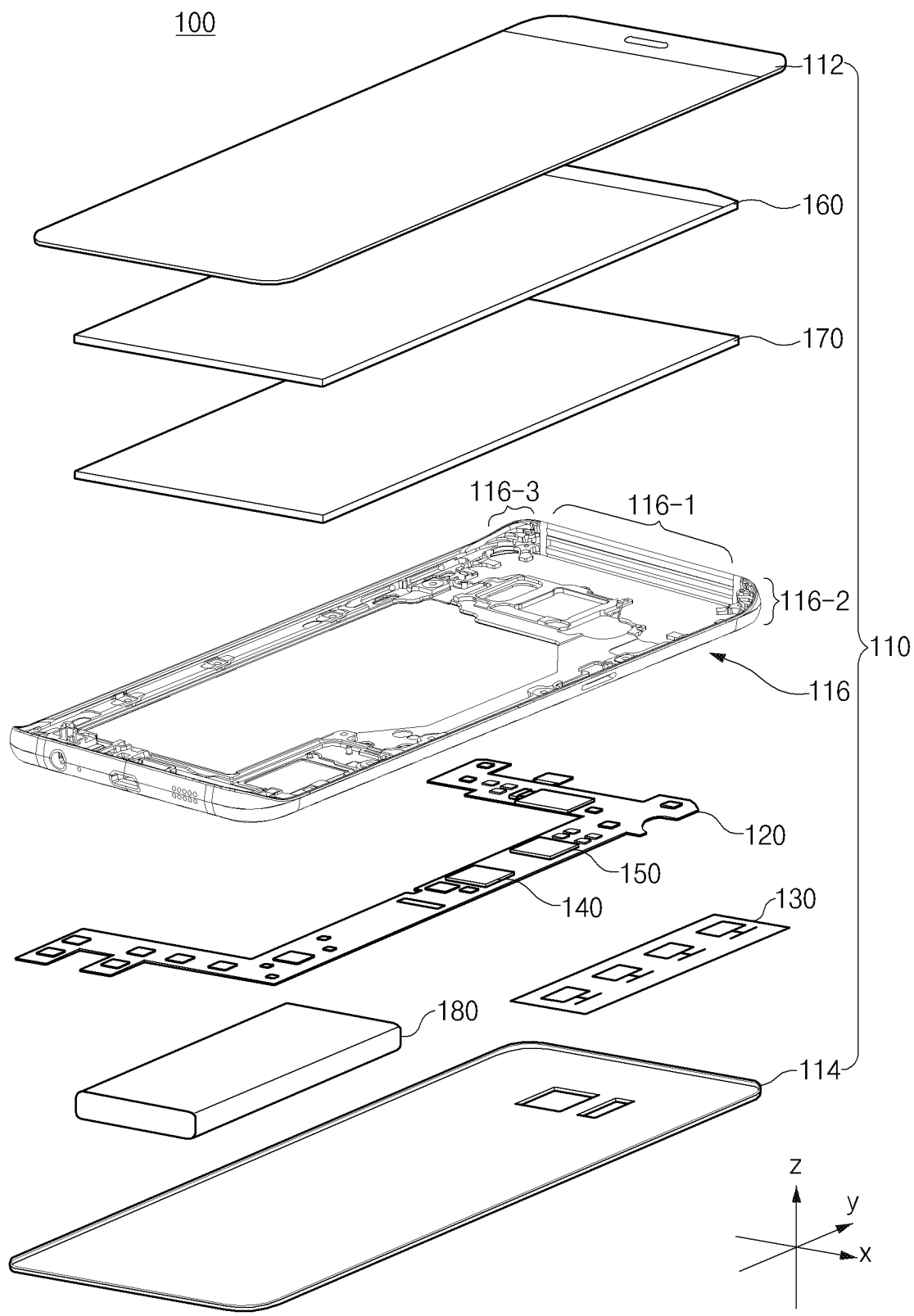
FIG. 2 is an exploded perspective view of an electronic device according to an embodiment.

An electronic device 100 according to an embodiment of the disclosure may include a plurality of antennas 116-1 and 116-2 and an antenna structure (e.g., 130 of FIG. 2).

The plurality of antennas 116-1 and 116-2 may be located in different regions of the electronic device 100. For example, the first antenna 116-1 may be located in a center top region of the electronic device 100, and the second antenna 116-2 may be located in a right top region of the electronic device 100.

The electronic device 100 may measure impedances of the first antenna 116-1, the second antenna 116-2, and the antenna structure (e.g., 130 of FIG. 2) and may sense location and contact of the external object (e.g., 20 of FIG. 1) based on the impedances. For example, when the hand 20 of the user approaches the electronic device 100, the electronic device 100 may sense the approaching direction and location of the hand 20 of the user. In another example, when the user grips the electronic device 100, the electronic device 100 may sense the location where the hand 20 of the user contacts the electronic device 100 and the form or shape of the grip.

According to an embodiment, the electronic device 100 may change a direction (hereinafter referred to as a "signal transmit/receive direction") in which the antenna structure (e.g., 130 of FIG. 2) transmits/receives a signal away from the external object (e.g., 20 of FIG. 1). For example, as illustrated in FIG. 1, when the user grips the electronic device 100 while the electronic device 100 transmits/receives a signal with a base station 30 in a first direction 41, the electronic device 100 may change the signal transmit/receive direction of the antenna structure (e.g., 130 of FIG. 1) into a second direction 42. According to an embodiment of the disclosure, the radiation performance of the antenna structure (e.g., 130 of FIG. 2) may be improved by transmitting/receiving a signal away from the external object (e.g., 20 of FIG. 1).

Herein, the first antenna 116-1 and the second antenna 116-2 may be referred to as a "$4^{th}$ generation (4G) antenna," "a long term evolution (LTE) antenna," or a "legacy antenna." The antenna structure (e.g., 130 of FIG. 2) may be referred to as a "$5^{th}$ generation (5G) antenna" or an "mmWave antenna." Also, herein, the top (or upper end) may mean a direction in which a receiver and a camera are located. In contrast, the bottom (or lower end) may mean a direction facing away from the top direction.

FIG. 2 is an exploded perspective view of an electronic device according to an embodiment.

Referring to FIG. 2, the electronic device 100 may include a housing 110, a printed circuit board (PCB) 120, an antenna structure 130, a processor 140, a memory 150, a display 160, a shielding layer 170, and/or a battery 180. According to an embodiment, the electronic device 100 may not include some of the components illustrated in FIG. 2 or may further include additional components not illustrated in FIG. 1. Also, the order in which the components included in the electronic device 100 are stacked may be different from the stacked order illustrated in FIG. 2.

The housing 110 may form the exterior of the electronic device 100. For example, the housing 110 may include a cover glass 112, a back cover 114 facing away from the cover glass 112, and a side member 116 surrounding a space between the cover glass 112 and the back cover 114.

The cover glass 112 may transmit a light generated by the display 160. Also, the user may touch a portion (e.g., a finger) of his/her body on the cover glass 112 to perform a touch. Alternatively, the user may use an electronic pen on the cover glass 112 to perform a touch. For example, the cover glass 112 may be formed of tempered glass, reinforced plastic, or a flexible polymer material.

The side member 116 may protect the components included in the electronic device 100. For example, the display 160, the printed circuit board 120, and the battery 180 may be accommodated within the side member 116, and the side member 116 may protect the components from external impact.

According to an embodiment, the side member 116 may be made of a conductive material and a non-conductive material. A region that is made of metal may be referred to as a "metal bezel." At least a portion of the metal bezel may be utilized as an antenna for transmitting/receiving a signal in a specified frequency band. For example, a center top region of the housing 110 may be utilized as the first antenna 116-1, a right top region of the housing 110 as the second antenna 116-2, and a left top region of the housing 110 as a third antenna 116-3. The first antenna 116-1 to the third antenna 116-3 may transmit/receive signals in a frequency band ranging from 0.7 GHz to 3.5 GHz.

The back cover 114 may be coupled with a back surface of the electronic device 100 (i.e., disposed under the side member 116). The back cover 114 may be made of tempered glass, plastic, and/or metal. According to an embodiment, the back cover 114 may be integrally implemented with the side member 116 or may be implemented to be removable by the user.

Various electronic components, elements, or printed circuits of the electronic device 100 may be mounted on the printed circuit board 120. For example, the processor 140 and the memory 150 may be mounted on the printed circuit board 120. In the specification, the printed circuit board 120 may be referred to as a "main board" or a "printed board assembly (PBA)."

The antenna structure 130 may transmit/receive a signal in a specific direction. For example, as illustrated in FIG. 2, in the case where the antenna structure 130 is disposed to face an x-direction, the antenna structure 130 may transmit/receive a signal in the x-direction. According to an embodiment, the frequency band of signals that the antenna structure 130 transmits/receives may range from 3.5 GHz to 100 GHz.

The processor 140 may be electrically connected with the first antenna 116-1, the second antenna 116-2, and the antenna structure 130. The processor 140 may measure impedances of the first antenna 116-1, the second antenna 116-2, and the antenna structure 130 and may sense location and contact of an external object (e.g., 20 of FIG. 1) based on the measured impedances. For example, when the user grips the electronic device 100, the electronic device 100 may sense the location where contact between the hand 20 of the user and the side member 116 is made. In another example, when the hand 20 of the user approaches the electronic device 100, the electronic device 100 may sense the approaching direction and location of the hand 20 of the user. The processor 140 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 140 may control the antenna structure 130 such that the antenna structure 130 transmits/receives signals in a direction away from the external object (e.g., 20 of FIG. 1), i.e. towards a location where the external object does not exist. For example, in the case where the hand 20 of the user is located in a negative x-direction, the processor 140 may control the antenna structure 130 such that the antenna structure 130 transmits/receives signals in the x-direction. Herein, the processor 140 may be referred to as a "communication processor (CP)."

The memory 150 may be electrically connected with the processor 140. The memory 150 may store a table where impedances of each of the first antenna 116-1, the second antenna 116-2, and the antenna structure 130 are mapped to locations of the external object (e.g., 20 of FIG. 1). The processor 140 may measure impedances of each of the first antenna 116-1, the second antenna 116-2, and the antenna structure 130, and may compare the measured impedances with those in the table to arrive at the location and contact of the external object (e.g., 20 of FIG. 1).

The display 160 may be viewable through a portion of the cover glass 112. The display 160 may be electrically connected with the printed circuit board 120, and may output content (e.g., text, image, video, icon(s), widget(s), symbol(s), etc.) and may receive a touch input (e.g., touch, gesture, or hovering input) from the user.

The shielding layer 170 may be interposed between the display 160 and the side member 116. The shielding layer 170 may shield electro-magnetic waves generated between the display 160 and the printed circuit board 120 to prevent electro-magnetic interference between the display 160 and the printed circuit board 120.

The battery 180 may convert chemical energy and electrical energy bidirectionally. For example, the battery 180 may convert chemical energy into electrical energy and may supply the converted electrical energy to the display 160 and various components or modules mounted on the printed circuit board 120. Alternatively, the battery 180 may convert and store electrical energy supplied from outside the electronic device into chemical energy. According to an embodiment, a power management module for managing the charging and discharging of the battery 180 may be included in the printed circuit board 120.

In the specification, the description given with reference to FIGS. 1 and 2 may be identically applied to components having the same reference numerals/marks as the components of the electronic device 100 illustrated in FIGS. 1 and 2.

Figure 3:
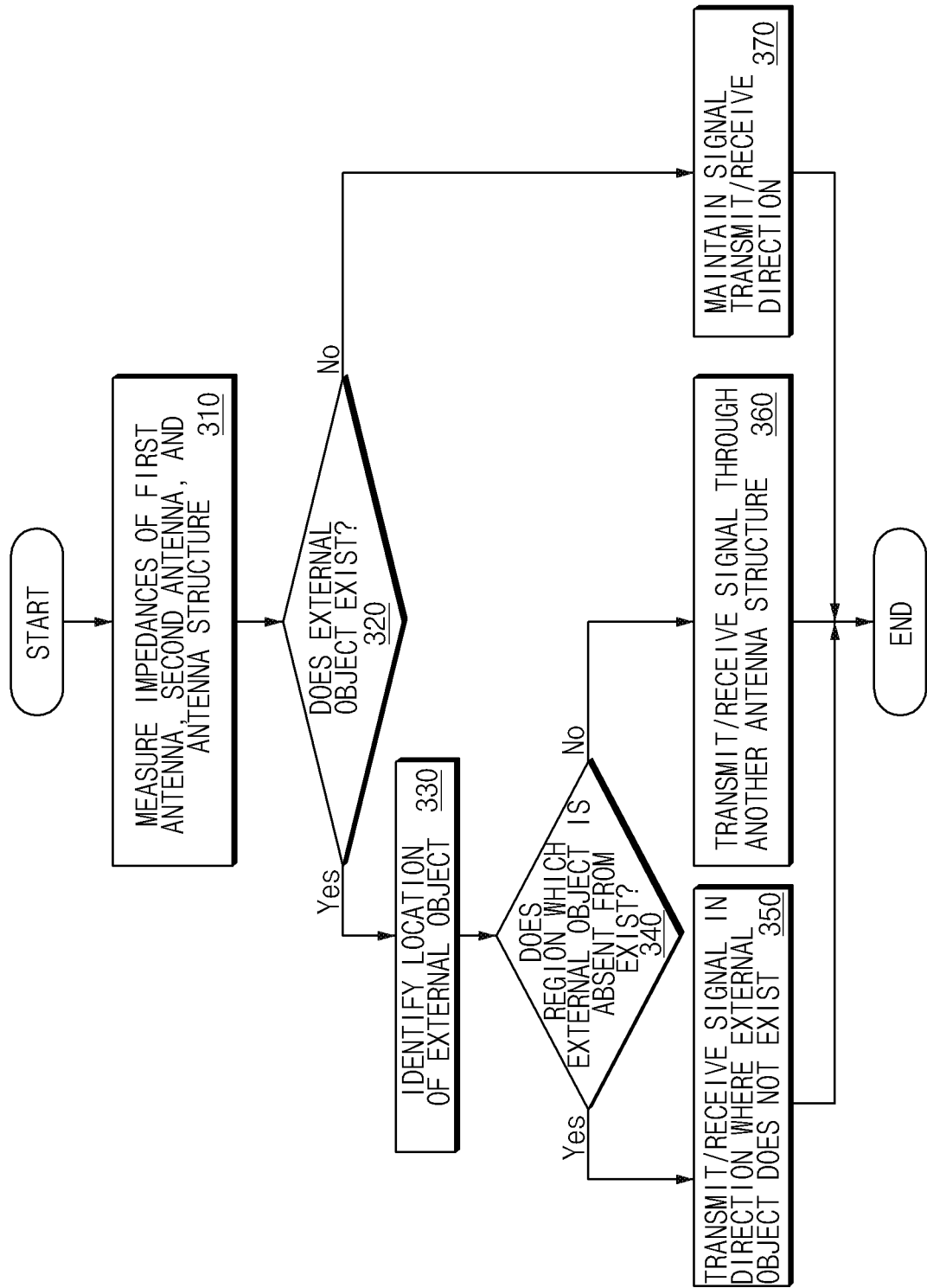
FIG. 3 illustrates an operational flowchart of an electronic device according to an embodiment.

FIG. 3 illustrates an operational flowchart of an electronic device according to an embodiment. FIG. 3 illustrates an operational flowchart of the electronic device 100 illustrated in FIGS. 1 and 2.

Referring to FIG. 3, in operation 310, the electronic device 100 (or the processor 140) may measure impedances of the first antenna 116-1, the second antenna 116-2, and the antenna structure 130. For example, the electronic device 100 may obtain reflection signals reflected while signals are transmitted to the first antenna 116-1, the second antenna 116-2, and the antenna structure 130. The electronic device 100 may measure the impedances of the first antenna 116-1, the second antenna 116-2, and the antenna structure 130, based on the obtained reflection signals.

In operation 320, the electronic device 100 may sense whether an external object (e.g., 20 of FIG. 1) exists around the electronic device 100, based on the measured impedances. The external object (e.g., 20 of FIG. 1) may include a dielectric and a conductor, and the electronic device 100 may sense, for example, whether the hand 20 of the user is close to the electronic device 100 and/or whether the hand 20 of the user contacts the electronic device 100. When the external object (e.g., 20 of FIG. 1) exists around the electronic device 100, operation 330 may be performed. When the external object (e.g., 20 of FIG. 1) does not exist around the electronic device 100, in operation 370, the electronic device 100 may maintain a signal transmit/receive direction of the antenna structure 130.

In operation 330, the electronic device 100 may identify a location of the external object (e.g., 20 of FIG. 1) by comparing the measured impedances with the table stored in the memory 150. For example, when the external object (e.g., 20 of FIG. 1) is spaced from the electronic device 100 by a certain distance, the electronic device 100 may identify a spacing distance between the electronic device 100 and the external object (e.g., 20 of FIG. 1). In another example, when the user grips the electronic device 100, the electronic device 100 may sense the location where contact with the external object (e.g., 20 of FIG. 1) is made.

In operation 340, the electronic device 100 may determine a region where the external object (e.g., 20 of FIG. 1) does not exist. For example, when the user grips a side surface of the electronic device 100, the electronic device 100 may determine that the top region and the bottom region of the electronic device 100 are regions where the external object (e.g., 20 of FIG. 1) does not exist. When there is a region where the external object (e.g., 20 of FIG. 1) does not exist, operation 350 may be performed. But when a region where the external object (e.g., 20 of FIG. 1) does not exist is absent, operation 360 may be performed.

In operation 350, the electronic device 100 may control the antenna structure 130 such that the antenna structure 130 transmits/receives signals in the direction where the external object (e.g., 20 of FIG. 1) does not exist. For example, in the case where the user grips the side surface of the electronic device 100, the electronic device 100 may control the antenna structure 130 such that the antenna structure 130 transmits/receives signals through the top region or the bottom region.

In operation 360, the electronic device 100 may transmit/receive signals through another antenna structure 130. For example, the electronic device 100 may include a plurality of antenna structures 130, and the plurality of antenna structures 130 may be located in different regions of the electronic device 100. When the radiation region of a first antenna (116-1) structure is blocked as the external object (e.g., 20 of FIG. 1) is present in a region corresponding to the first antenna (116-1) structure, the electronic device 100 may transmit/receive signals by using a second antenna (116-2) structure among the plurality of antenna structures 130.

Figure 4:
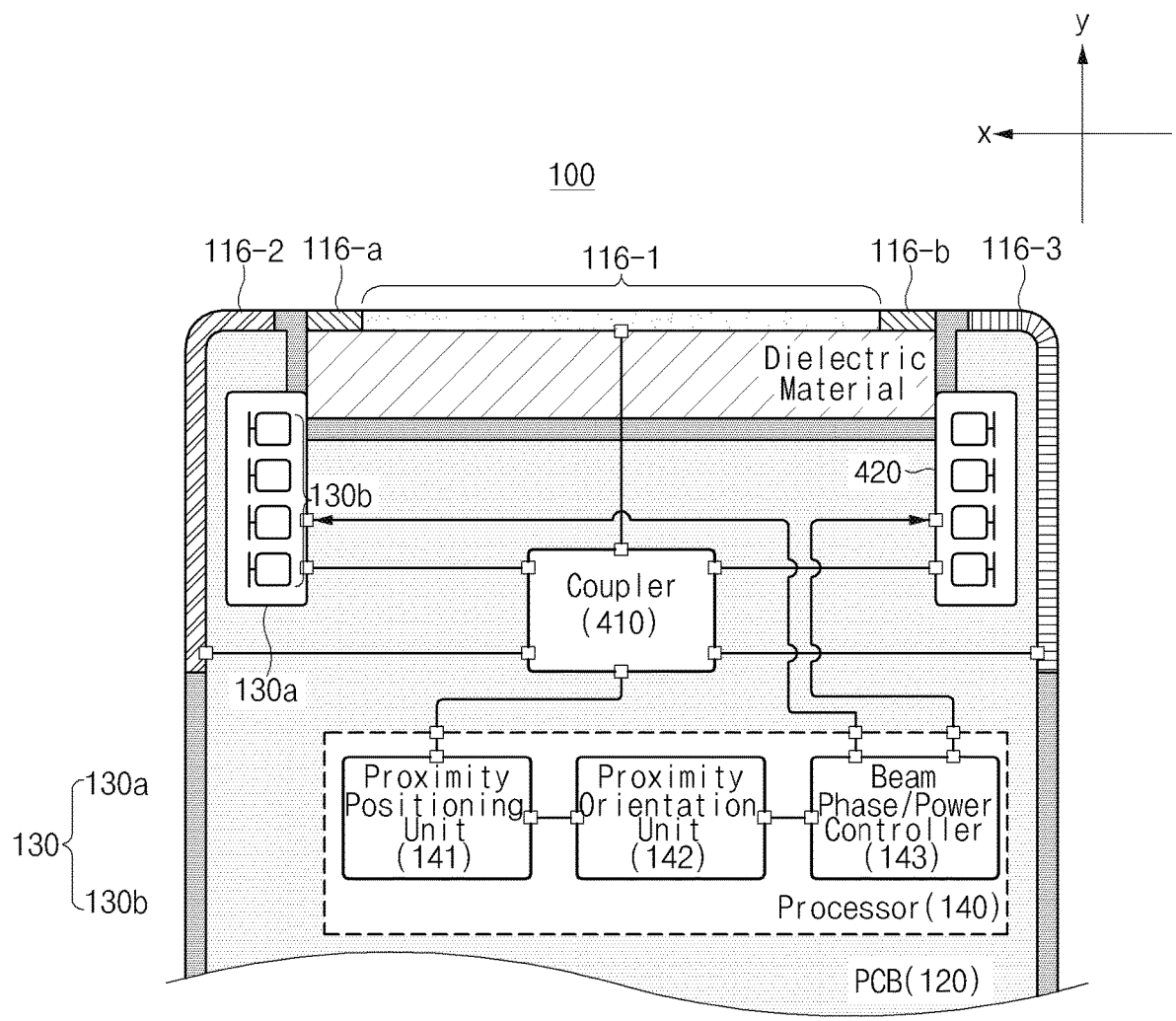
FIG. 4 is an enlarged view of a portion of an electronic device according to an embodiment.

FIG. 4 is an enlarged view of a portion of an electronic device according to an embodiment. FIG. 4 illustrates the side member 116 and the printed circuit board 120 when viewed above from the back cover 114, when the back cover 114 is removed.

Referring to FIG. 4, the electronic device 100 may include a coupler 410, and the processor 140 may include a proximity positioning unit 141, a proximity orientation unit 142, and/or a beam phase/power controller 143.

The antenna structure 130 may include an antenna mounting substrate 130a and a plurality of antenna elements 130b disposed on the antenna mounting substrate 130a. The plurality of antenna elements 130b may include at least one of dipole antennas, patch antennas, and monopole antennas.

The coupler 410 may be disposed on the printed circuit board 120. When signals from the processor 140 are transmitted through the first antenna 116-1, the second antenna 116-2, and the antenna structure 130, the coupler 410 may monitor the signals. For example, the coupler 410 may monitor whether a signal that the processor 140 intends to transmit is transmitted and/or whether a signal having an appropriate power amount is transmitted. According to an embodiment, the coupler 410 may transmit, to the processor 140, reflection signals reflected when the signals from the processor 140 pass through the first antenna 116-1, the second antenna 116-2, and the antenna structure 130. In the specification, the coupler 410 may also be referred to as a "feedback circuit".

The proximity positioning unit 141 may measure impedances of the first antenna 116-1, the second antenna 116-2, and the antenna structure 130, based on the reflection signals received from the coupler 410. Also, the proximity positioning unit 141 may sense location and contact of an external object (e.g., 20 of FIG. 1) by comparing the measured impedances with values of the table stored in the memory 150.

The proximity orientation unit 142 may determine a direction in which the antenna structure 130 will transmit/receive a signal, based on the location and the contact of the external object (e.g., 20 of FIG. 1) sensed by the proximity positioning unit 141. For example, the proximity orientation unit 142 may calculate a region in which the external object (e.g., 20 of FIG. 1) does not exist, and may determine signal transmit/receive direction of the antenna structure 130 towards that region.

The beam phase/power controller 143 may control the antenna structure 130 such that the antenna structure 130 transmits/receives signals in the direction determined by the proximity orientation unit 142. For example, when the direction determined by the proximity orientation unit 142 is the x-direction, the beam phase/power controller 143 may adjust a phase of current and power to be applied to the antenna structure 130 and may control the antenna structure 130 such that the antenna structure 130 transmits/receives signals in the x-direction.

According to another embodiment, the description given with reference to the second antenna 116-2 may be applied to the third antenna 116-3, and the description given with reference to the third antenna 116-3 may be applied to an additional antenna structure 420. For example, the processor 140 may sense location and contact of the external object (e.g., 20 of FIG. 1) based on impedances measured from the first antenna 116-1, the third antenna 116-3, and the additional antenna structure 420. The processor 140 may determine the direction in which the additional antenna structure 420 will transmit/receive a signal, based on the location and the contact of the external object (e.g., 20 of FIG. 1).

In the disclosure, the description given with reference to FIG. 4 may be identically applied to the coupler 410 and the processor 140 in other drawings.

According to an embodiment, the first antenna 116-1, the second antenna 116-2, and the third antenna 116-3 may be spaced from each other. For example, a first slit 116-a may be formed between the first antenna 116-1 and the second antenna 116-2, and a second slit 116-b may be formed between the first antenna 116-1 and the third antenna 116-3. A non-conductive material may be filled in the first slit 116-a and the second slit 116-b, and thus, isolation between the first antenna 116-1 and the second antenna 116-2 and isolation between the first antenna 116-1 and the third antenna 116-3 can be achieved.

Figure 5:
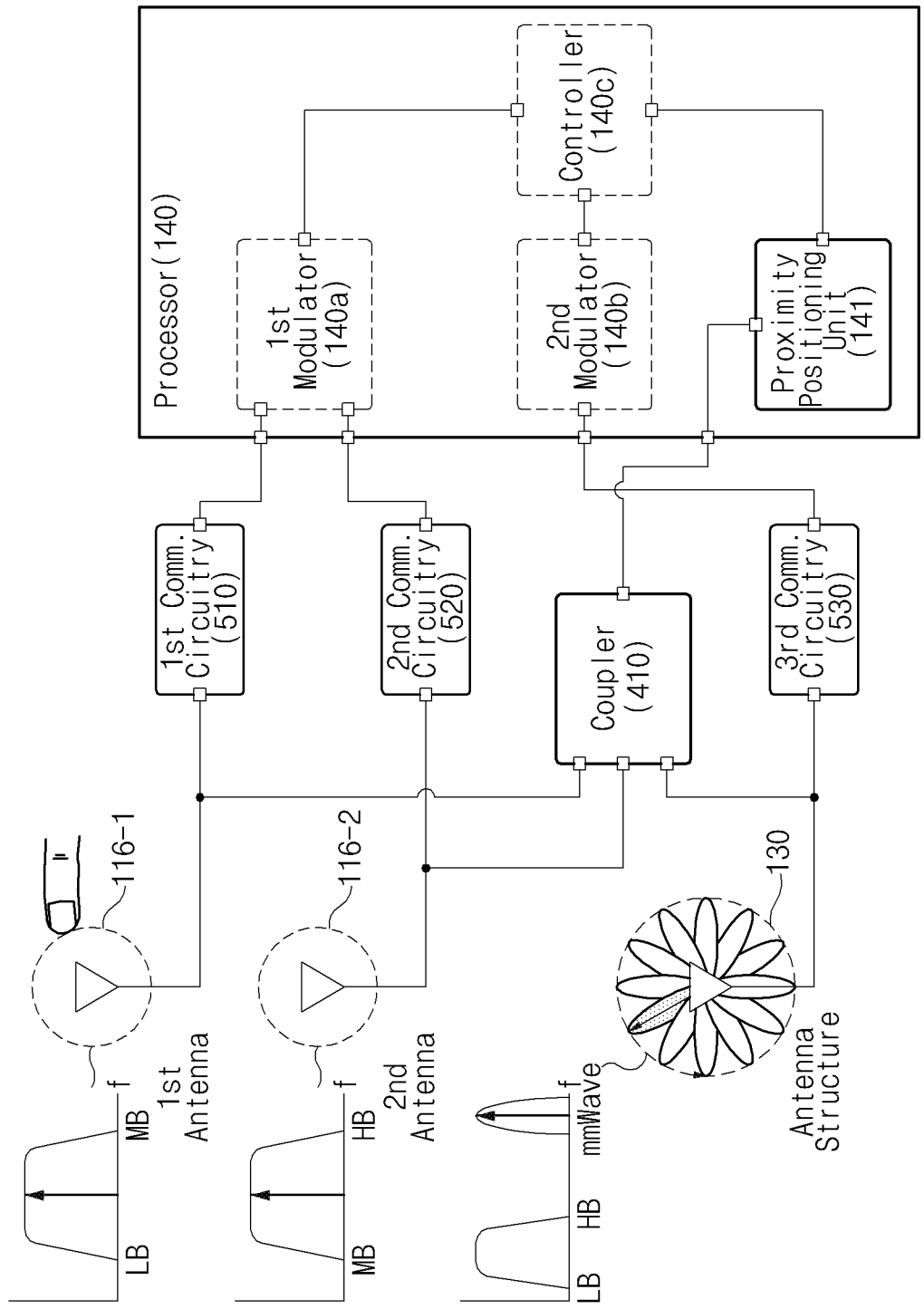
FIG. 5 illustrates a block diagram of a portion of an electronic device according to an embodiment.

FIG. 5 illustrates a block diagram of a portion of an electronic device according to an embodiment. FIG. 5 is a block diagram where a connection relationship between the first antenna 116-1, the second antenna 116-2, the antenna structure 130, and the processor 140 is illustrated.

Referring to FIG. 5, the electronic device 100 may include a first wireless communication circuitry 510, a second wireless communication circuitry 520, and a third wireless communication circuitry 530, and the processor 140 may include a first modulator 140a, a second modulator 140b, and a controller 140c.

The first wireless communication circuitry 510, the second wireless communication circuitry 520, and the third wireless communication circuitry 530 may be electrically connected with the processor 140. The first wireless communication circuitry 510 may feed power to the first antenna 116-1, the second wireless communication circuitry 520 to the second antenna 116-2, and the third wireless communication circuitry 530 to the antenna structure 130. Herein, the term "feed," "feed a power," or "feeding" may means an operation in which the first wireless communication circuitry 510, the second wireless communication circuitry 520, or the third wireless communication circuitry 530 applies a current to the first antenna 116-1, the second antenna 116-2, or the antenna structure 130, respectively. The first wireless communication circuitry 510 and the second wireless communication circuitry 520 may be referenced to as a "4G antenna radio frequency integrated circuit (RFIC)," a "legacy antenna RFIC," or a "long term evolution (LTE) antenna RFIC." The third wireless communication circuitry 530 may be referred to as a "5G antenna RFIC" or an "mmWave antenna RFIC".

The first modulator 140a may modulate signals received from the controller 140c and may transmit the modulated signals to the first wireless communication circuitry 510 and/or the second wireless communication circuitry 520. The second modulator 140b may modulate signals received from the controller 140c and may transmit the modulated signal to the third wireless communication circuitry 530s.

When signals from the first wireless communication circuitry 510, the second wireless communication circuitry 520, and the third wireless communication circuitry 530 are transmitted through the first antenna 116-1, the second antenna 116-2, and the antenna structure 130, the coupler 410 may monitor the signals. According to an embodiment, the coupler 410 may transmit, to the proximity positioning unit 141, reflection signals reflected when the signals from the first wireless communication circuitry 510, the second wireless communication circuitry 520, and the third wireless communication circuitry 530 pass through the first antenna 116-1, the second antenna 116-2, and the antenna structure 130.

The proximity positioning unit 141 may measure impedances of the first antenna 116-1, the second antenna 116-2, and the antenna structure 130, based on the reflection signals received from the coupler 410. In doing so, the proximity positioning unit 141 may sense the location and the contact of an external object (e.g., 20 of FIG. 1) by comparing the measured impedances with values stored in the table stored in the memory 150.

The controller 140c may determine a direction in which the antenna structure 130 will transmit/receive signals based on the location and the contact of the external object (e.g., 20 of FIG. 1) sensed by the proximity positioning unit 141. For example, the controller 140c may calculate a region in which the external object (e.g., 20 of FIG. 1) does not exist, and may determine signal transmit/receive direction of the antenna structure 130 towards that region.

The controller 140c may control the antenna structure 130 such that the antenna structure 130 transmits/receives signals in the direction where the external object (e.g., 20 of FIG. 1) does not exist. For example, when the direction where the external object (e.g., 20 of FIG. 1) does not exist is the x-direction, the controller 140c may adjust a phase of current and power to be applied to the antenna structure 130 and may control the antenna structure 130 such that the antenna structure 130 transmits/receives signals in the x-direction.

Figure 6A:
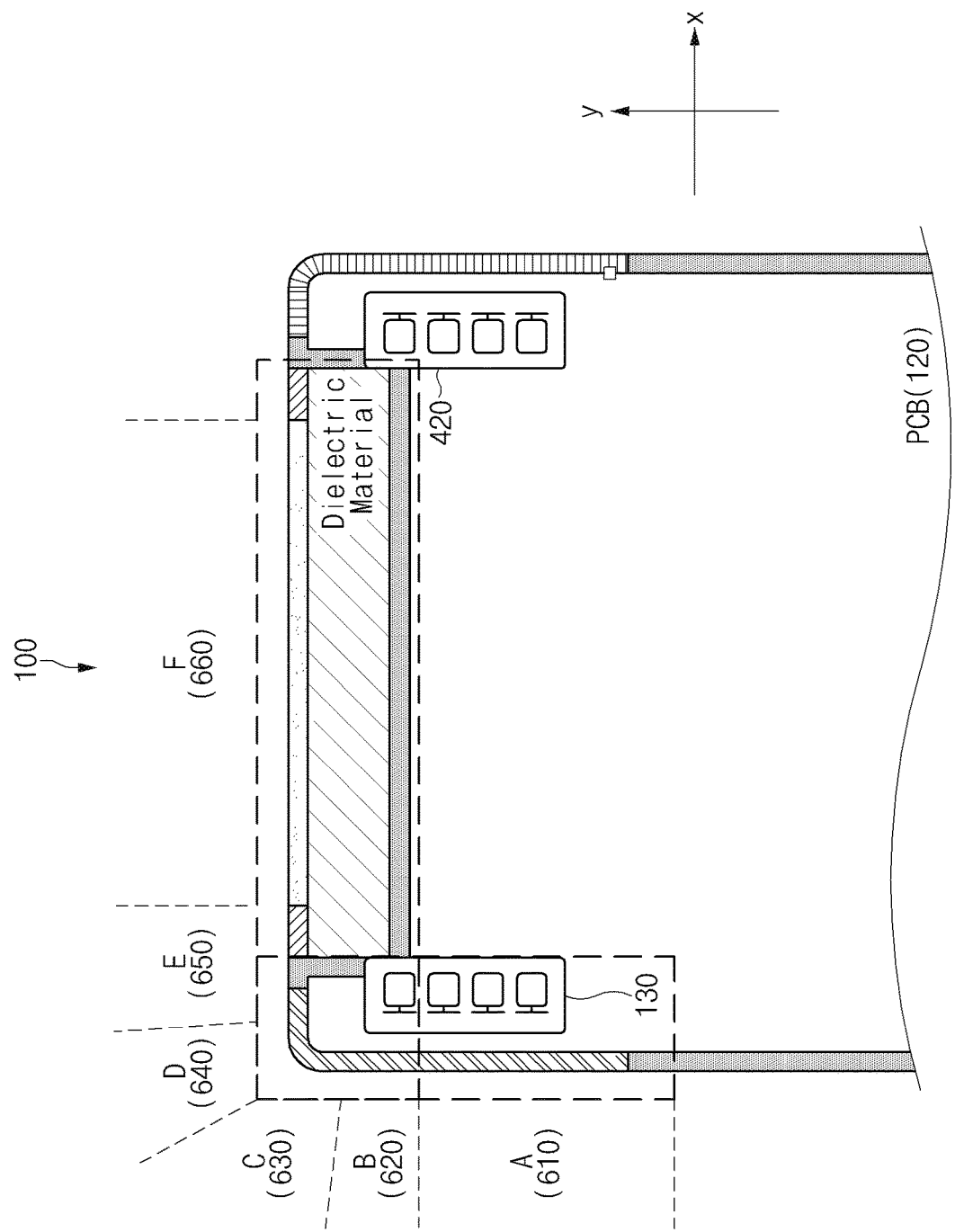
FIG. 6A illustrates sensing regions of an electronic device according to an embodiment.
Figure 6B:
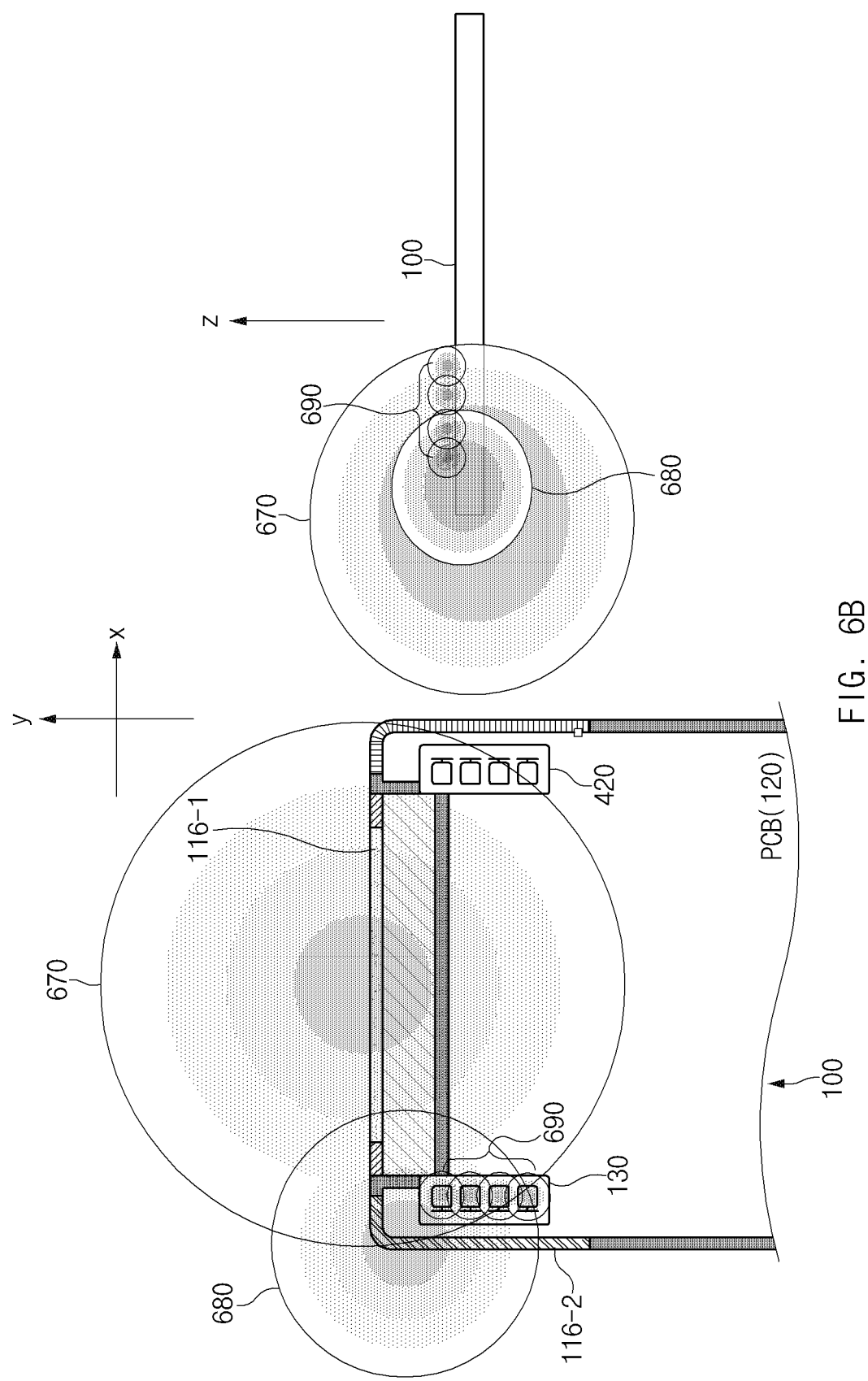
FIG. 6B illustrates sensing regions of a first antenna, a second antenna, and an antenna structure according to an embodiment.

FIG. 6A illustrates sensing regions of an electronic device according to an embodiment. FIG. 6B illustrates sensing regions of a first antenna, a second antenna, and an antenna structure according to an embodiment. Herein, the sensing region may indicate a region where the electronic device 100, the first antenna 116-1, the second antenna 116-2, or the antenna structure 130 is/are able to sense an external object (e.g., 20 of FIG. 1).

Referring to FIG. 6A, the electronic device 100 may sense whether the external object (e.g., 20 of FIG. 1) is located in at least any one of an "A" region 610 to an "F" region 660. For example, the electronic device 100 may obtain reflection signals reflected while signals are transmitted through the first antenna 116-1 and the second antenna 116-2. The electronic device 100 may measure impedances of the first antenna 116-1 and the second antenna 116-2, based on the obtained reflection signals. The electronic device 100 may compare the impedances of the first antenna 116-1 and the second antenna 116-2 with the table stored in the memory 150 and may sense whether the external object (e.g., 20 of FIG. 1) is located in at least any one of the "A" region 610 to the "F" region 660.

Also, the electronic device 100 may obtain a reflection signal reflected from the antenna structure 130 while a signal is transmitted through the antenna structure 130. The electronic device 100 may measure an impedance of the antenna structure 130 based on the reflection signal reflected from the antenna structure 130. The electronic device 100 may compare the impedance of the antenna structure 130 with the table stored in the memory 150 and may sense whether the external object (e.g., 20 of FIG. 1) contacts a region corresponding to the antenna structure 130.

According to an embodiment, when it is sensed that the external object (e.g., 20 of FIG. 1) is located in at least one of the "A" region 610 to the "F" region 660, the electronic device 100 may determine a signal transmit/receive direction of the antenna structure 130. For example, in the case where it is determined that the external object (e.g., 20 of FIG. 1) is present in the "D" region 640, the electronic device 100 may control the antenna structure 130 such that the antenna structure 130 transmits/receives signals through the "A" region 610.

The embodiment illustrated in FIG. 6A is exemplary, and the electronic device 100 may sense whether the external object (e.g., 20 of FIG. 1) is approaching the electronic device 100 in a region different from the regions illustrated in FIG. 6A or in a direction different from the directions illustrated in FIG. 6A. For example, the electronic device 100 may sense the location of the external object (e.g., 20 of FIG. 1) based on the first antenna 116-1 and the third antenna 116-3 and may determine a signal transmit/receive direction of the additional antenna structure 420. For another example, when it is determined that the external object (e.g., 20 of FIG. 1) contacts the region corresponding to the antenna structure 130, the electronic device 100 may control the additional antenna structure 420 such that signals are transmitted/received through the additional antenna structure 420.

Referring to FIG. 6B, the electronic device 100 may sense whether the external object (e.g., 20 of FIG. 1) approaches in the x-direction, the negative x-direction, the y-direction, the negative y-direction, the z-direction, or the negative z-direction. For example, a first region 670 indicates a sensing region of the first antenna 116-1, a second region 680 indicates a sensing region of the second antenna 116-2, and a third region 690 indicates a sensing region of the antenna structure 130. The first region 670, the second region 680, and the third region 690 are three-dimensional regions as illustrated in FIG. 6B. As such, the electronic device 100 may sense that an external object is approaching the front surface, the back surface, and/or the side surface of the electronic device 100 through the first antenna 116-1, the second antenna 116-2, and the antenna structure 130.

According to an embodiment, sensing ranges of the first antenna 116-1, the second antenna 116-2, and the antenna structure 130 may be different. For example, as illustrated in FIG. 6B, the sensing range of the first antenna 116-1 may be the widest, and the sensing range of the antenna structure 130 may be the narrowest. Accordingly, the antenna structure 130 may sense the external object when the external object is very close to the antenna structure 130.

Figure 7A:
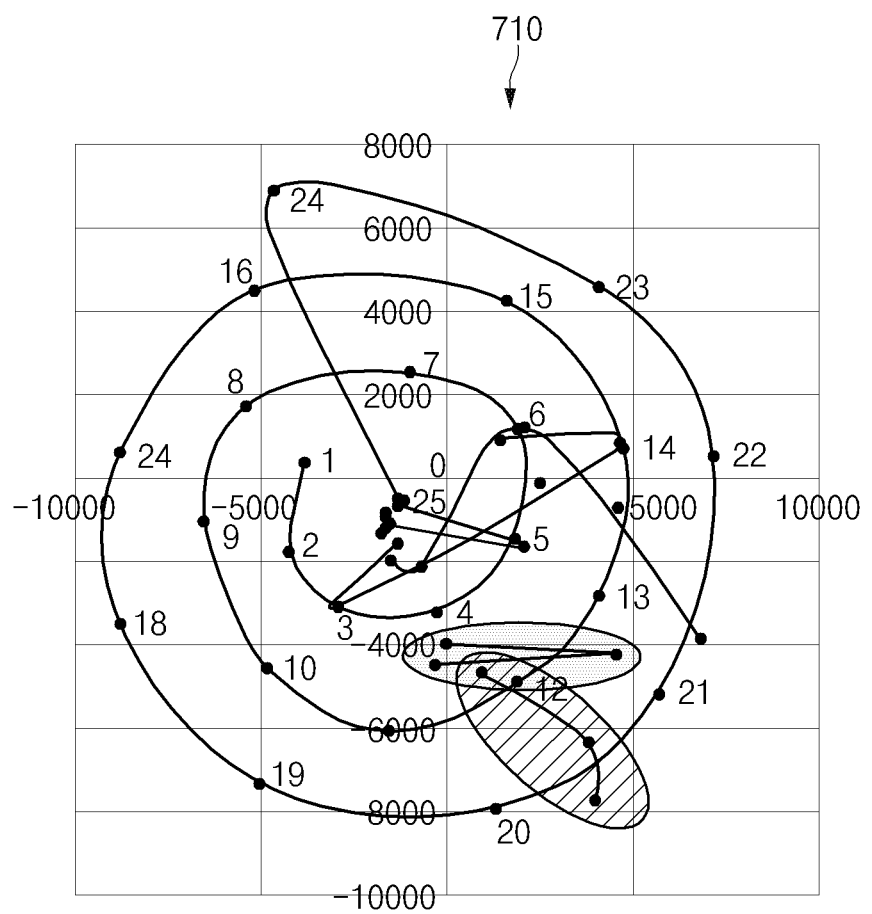
FIG. 7A illustrates an impedance table of a first antenna according to an embodiment.
Figure 7B:
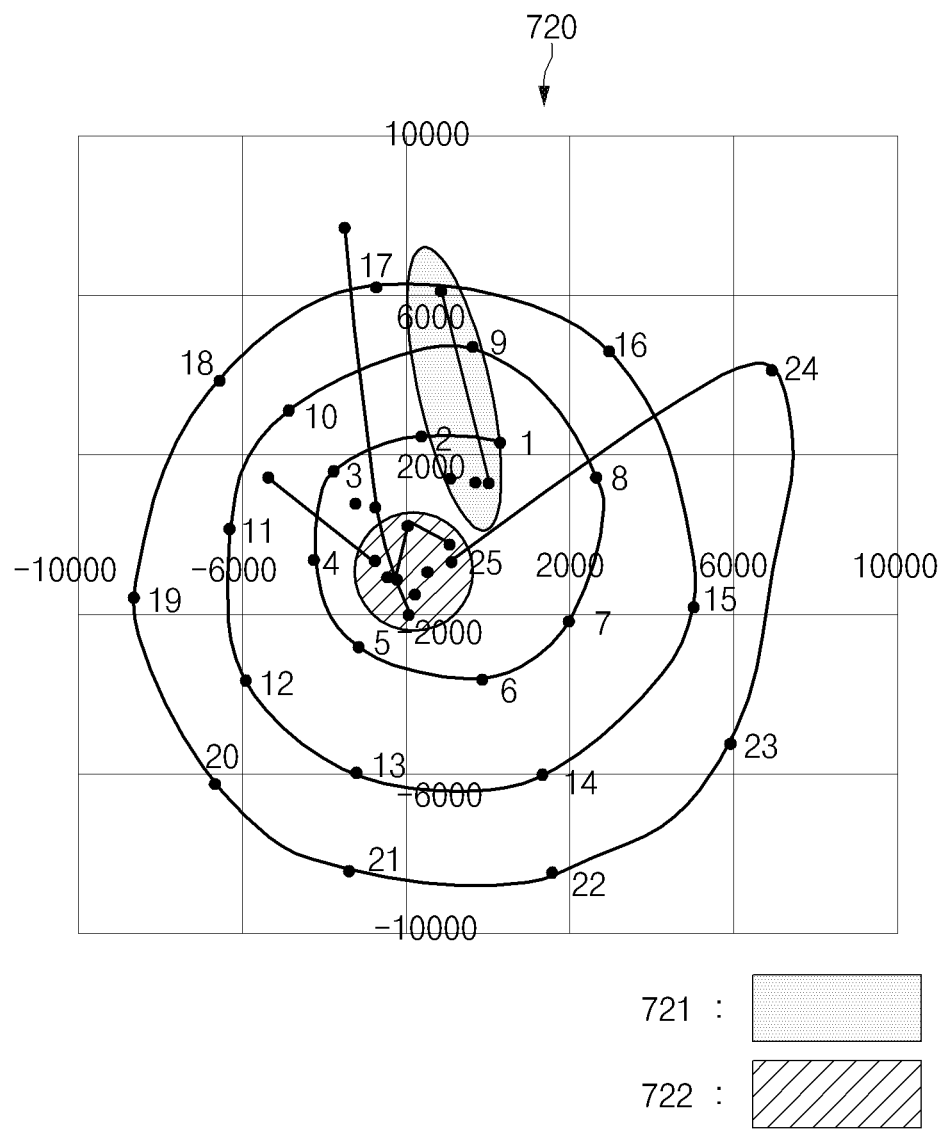
FIG. 7B illustrates an impedance table of a second antenna according to an embodiment.
Figure 7C:
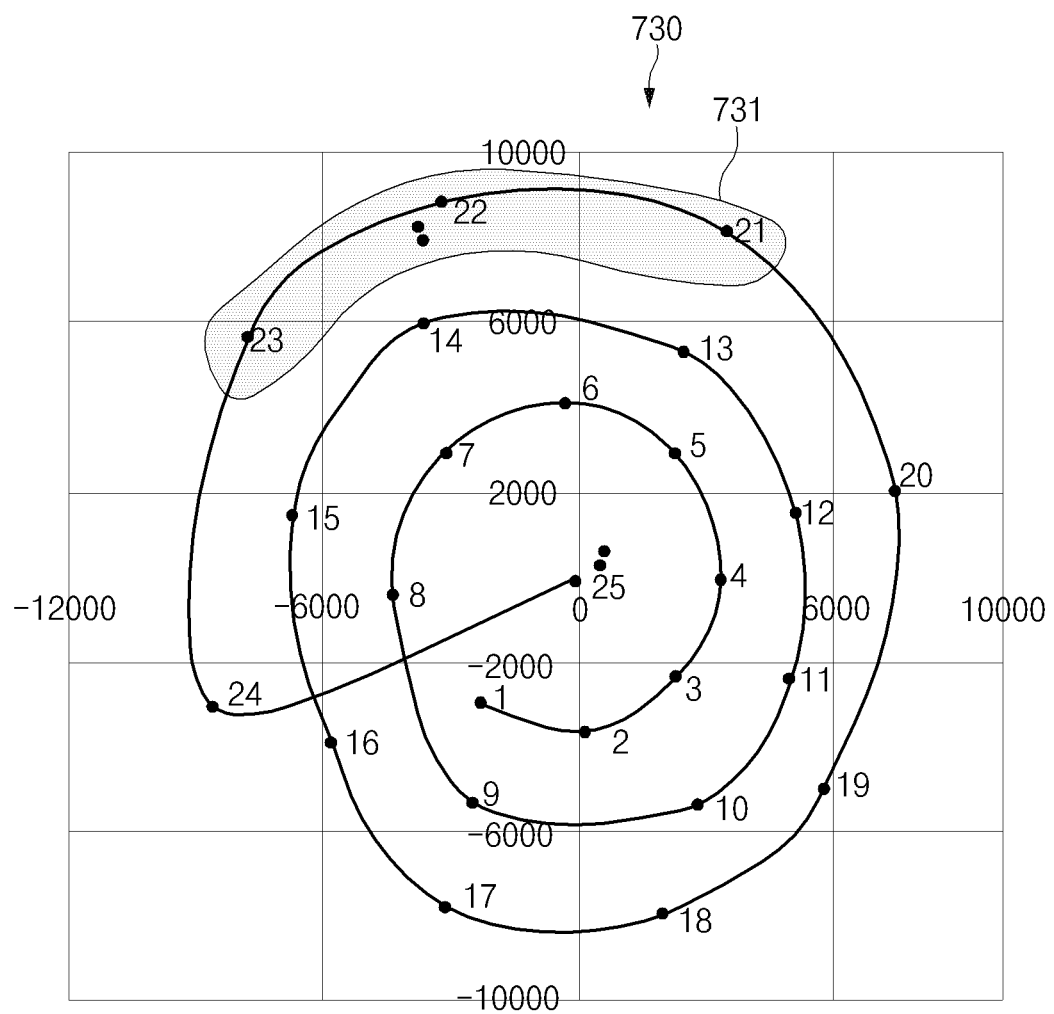
FIG. 7C illustrates an impedance table of an antenna structure according to an embodiment.

FIG. 7A illustrates an impedance table of a first antenna according to an embodiment. FIG. 7B illustrates an impedance table of a second antenna according to an embodiment. FIG. 7C illustrates an impedance table of an antenna structure according to an embodiment. Tables 710, 720, and 730 illustrated in FIGS. 7A to 7C may be stored in the memory 150. The process where the processor 140 compares a measured impedance with the tables 710, 720, and 730 will be described with reference to FIGS. 7A to 7C.

Referring to FIG. 7A, the impedance table 710 of the first antenna 116-1 may include a plurality of indices. In the specification, the term "index" may mean a reference value related to an impedance of an antenna (e.g., the first antenna 116-1, the second antenna 116-2, and the antenna structure 130). The reference value can be applied to Table 1 and compared with "indices" of an antenna. The processor 140 may sense the location of an external object (e.g., 20 of FIG. 1) by comparing the impedance measured from the first antenna 116-1 with the impedance table 710. For example, when the impedance measured from the first antenna 116-1 is included in a first region 711 (e.g., corresponds to index 12), it may be determined that a left hand of the user is close to the electronic device 100. In another example, when the impedance measured from the first antenna 116-1 is included in a second region 712 (e.g., corresponds to a value between index 20 and index 21), it may be determined that a right hand of the user is close to the electronic device 100.

Referring to FIG. 7B, the impedance table 720 of the second antenna 116-2 may also include a plurality of indices. The processor 140 may sense the location of the external object (e.g., 20 of FIG. 1) by comparing the impedance measured from the second antenna 116-2 with the impedance table 720. For example, when the impedance measured from the second antenna 116-2 is included in a third region 721 (e.g., corresponds to index 9), it may be determined that the left hand of the user is close to the electronic device 100. In another example, when the impedance measured from the second antenna 116-2 is included in a fourth region 722 (e.g., corresponds to index 25), it may be determined that the right hand of the user is close to the electronic device 100.

TABLE 1

| | | Indices of second antenna (116-2) | | | | | | | | | | |
|---|---|---|---|---|---|---|---|---|---|---|---|---|
| | | 0 | 1 | 2 | 3 | 4 | 5 | 6 | 7 | 8 | 9 | 10 |
| Indexes of first antenna (116-1) | 0 | | | | | | | | | | | |
| | 1 | | | | | | | | | | | |
| | 2 | | | | | | | | | | | |
| | 3 | | | | | | | | | | | |
| | 4 | A | AB | B | | | | | | | B | |
| | 5 | A | AB | B | | | | | | | BE | BE |
| | 6 | | | | | | | | | | | |
| | 7 | | | | | | | | | | | |
| | 8 | | | | | | | | | | | |
| | 9 | | | | | | | | | | | |
| | 10 | | | | | | | | | | | |
| | 11 | | | | | | | | | | | |
| | 12 | A | ABC | BC | BC | BC | BCF | | | | BCE | CE |
| | 13 | A | ABCD | BCD | BCD | BC | BCF | | | | BCDE | CDE |
| | 14 | | | | | | | | | | | |
| | 15 | | | | | | | | | | | |
| | 16 | | | | | | | | | | | |
| | 17 | | | | | | | | | | | |
| | 18 | | | | | | | | | | | |
| | 19 | | | | | | | | | | | |

TABLE 1-continued

| | 11 | 12 | 13 | 14 | 15 | 16 | 17 | 18 | 19 | 20 | 21 | 22 | 23 | 24 |
|---|---|---|---|---|---|---|---|---|---|---|---|---|---|---|
| 20 | A | BC | BC | BC | BC | BCF | | | | | | C | | |
| 21 | | C | CD | CD | C | CF | | | | | | DE | E | |
| 22 | | | | | | | | | | | | | | |
| 23 | | | | | | | | | | | | | | |
| 24 | | | | | | | | | | | | | | |

| | | Indices of second antenna (116-2) | | | | | | | | | | | | |
|---|---|---|---|---|---|---|---|---|---|---|---|---|---|---|
| | | 11 | 12 | 13 | 14 | 15 | 16 | 17 | 18 | 19 | 20 | 21 | 22 | 23 | 24 |

| | | | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|
| Indexes | 0 | | | | | | | | | | | | | | | |
| of first | 1 | | | | | | | | | | | | | | | |
| antenna | 2 | | | | | | | | | | | | | | | |
| (116-1) | 3 | | | | | | | | | | | | | | | |
| | 4 | | | | | | | | BCDE | E | | | | | | |
| | 5 | | | | | | | | CDE | E | | | | | | |
| | 6 | | | | | | | | | | | | | | | |
| | 7 | | | | | | | | | | | | | | | |
| | 8 | | | | | | | | | | | | | | | |
| | 9 | | | | | | | | | | | | | | | |
| | 10 | | | | | | | | | | | | | | | |
| | 11 | | | | | | | | | | | | | | | |
| | 12 | | | | | | | | BCE | E | | | | | | |
| | 13 | | | | | | | | CDE | E | | | | | | |
| | 14 | | | | | | | | | | | | | | | |
| | 15 | | | | | | | | | | | | | | | |
| | 16 | | | | | | | | | | | | | | | |
| | 17 | | | | | | | | | | | | | | | |
| | 18 | | | | | | | | | | | | | | | |
| | 19 | | | | | | | | | | | | | | | |
| | 20 | | F | F | | | | | | | | | | F | | |
| | 21 | | F | F | | | | | CDE | E | | | | F | | |
| | 22 | | | | | | | | | | | | | | | |
| | 23 | | | | | | | | | | | | | | | |
| | 24 | | | | | | | | | | | | | | | |

Table 1 is a table where indices of the first antenna 116-1, indices of the second antenna 116-2, and the sensing regions 610 to 660 are matched. The electronic device 100 may sense whether the external object (e.g., 20 of FIG. 1) is located in at least any one of the "A" region 610 to the "F" region 660 illustrated in FIG. 6A, based on Table 1. For example, when the impedance measured from the first antenna 116-1 corresponds to index 4 and the impedance measured from the second antenna 116-2 corresponds to index 1, the electronic device 100 may determine that the left hand of the user is located in the "A" region 610 and the "B" region 620. In another example, when the impedance measured from the first antenna 116-1 corresponds to index 12 and the impedance measured from the second antenna 116-2 corresponds to index 17, the electronic device 100 may determine that the left hand of the user is located in the "B" region 620, the "C" region 630, and the "E" region 650.

Referring to FIG. 7C, the impedance table 730 of the antenna structure 130 may also include a plurality of indices. Unlike impedances of the first antenna 116-1 and the second antenna 116-2, the impedance of the antenna structure 130 may have "1" or a "0" as values thereof. When the impedance of the antenna structure 130 is "0," the processor 140 may determine that the external object (e.g., 20 of FIG. 1) does not contact a region corresponding to the antenna structure 130. When the impedance of the antenna structure 130 is "1," the processor 140 may determine that the external object (e.g., 20 of FIG. 1) contacts the region corresponding to the antenna structure 130. In FIG. 7C, impedance values of indices included in a partial region 731 may be "1." For example, the impedance values of index 21, index 22, and index 23 may be "1," and when the measured impedance value of the antenna structure 130 corresponds to index "21," index "22," or index "23," the processor 140 may determine that the external object (e.g., 20 of FIG. 1) contacts the region corresponding to the antenna structure 130.

Figure 8A:
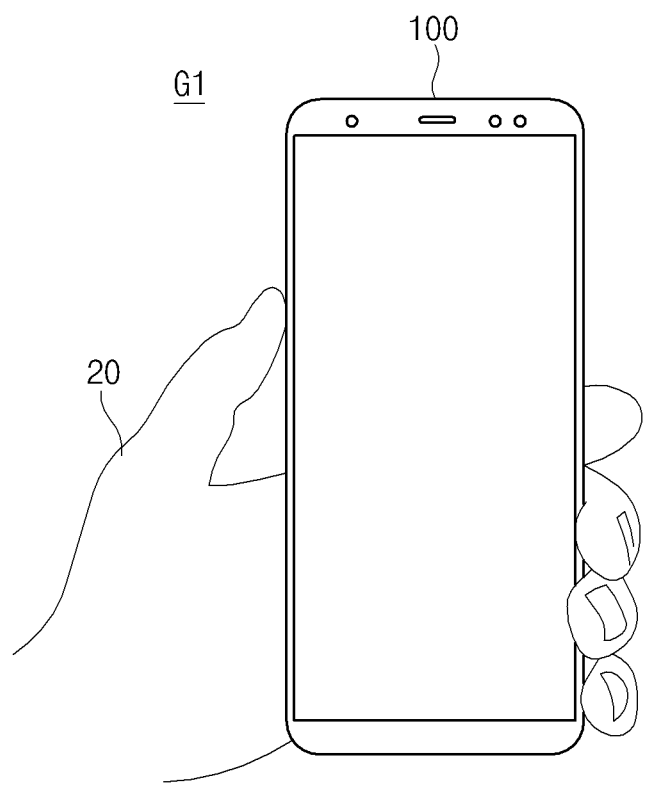
FIG. 8A and FIG. 8B illustrate states where a user grips an electronic device in the form of a first grip, according to an embodiment.
Figure 8B:
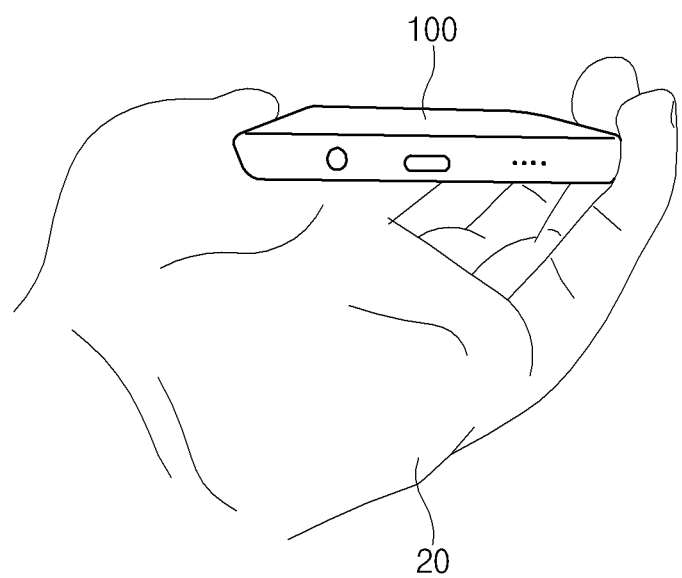

FIGS. 8A and 8B illustrate states where a user grips an electronic device in the form of a first grip, according to an embodiment. FIG. 8A illustrates a front surface of the electronic device 100 in the case where the user grips the electronic device 100 in the form of a first grip G1. FIG. 8B illustrates a bottom region of the electronic device 100 in the case where the user grips the electronic device 100 in the form of the first grip G1.

Figure 9A:
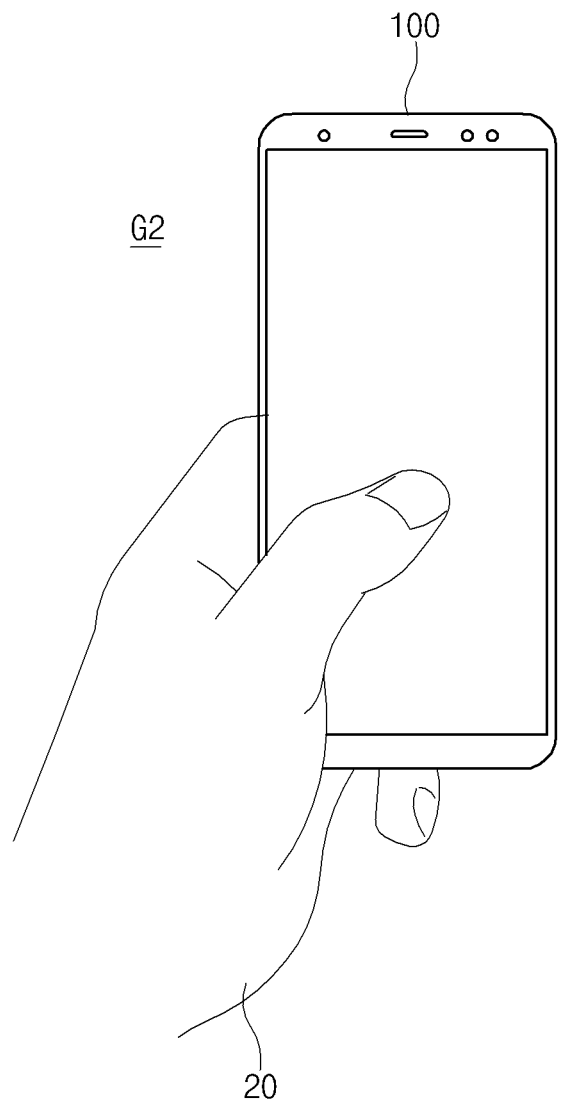
FIG. 9A and FIG. 9B illustrate states where a user grips an electronic device in the form of a second grip, according to an embodiment.
Figure 9B:
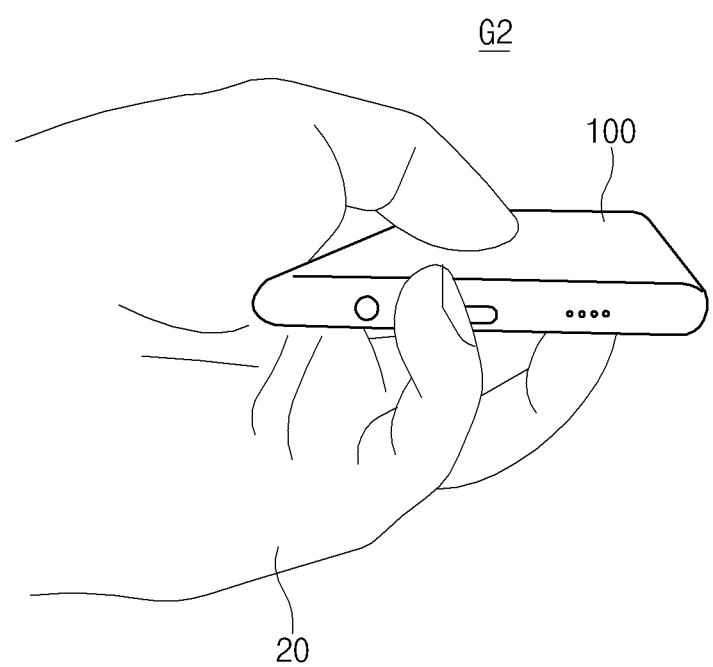

FIGS. 9A and 9B illustrate states where a user grips an electronic device in the form of a second grip, according to an embodiment. FIG. 9B illustrates a front surface of the electronic device 100 in the case where the user grips the electronic device 100 in the form of a second grip G2. FIG. 9B illustrates a bottom region of the electronic device 100 in the case where the user grips the electronic device 100 in the form of the second grip G2.

Figure 10A:
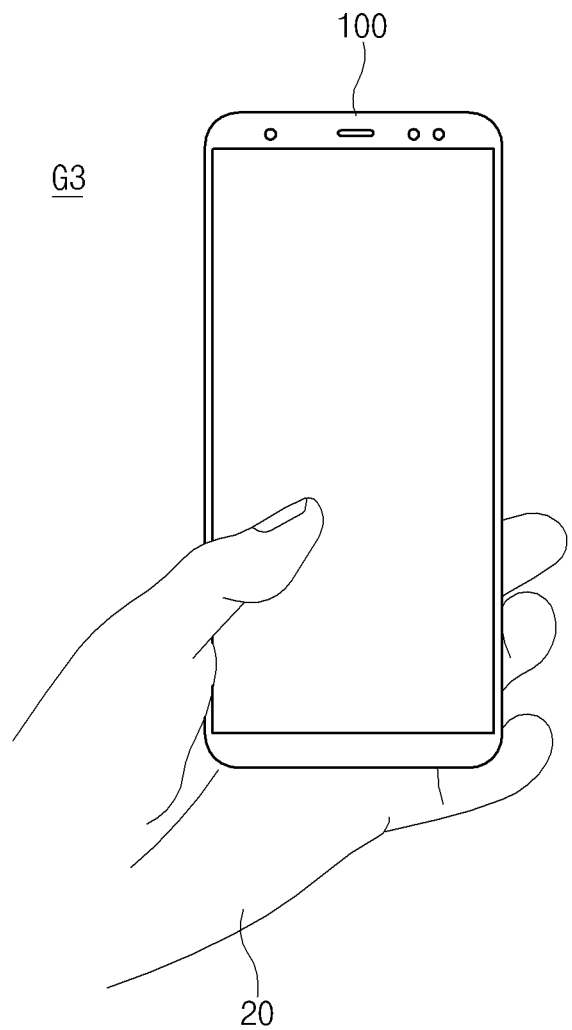
FIG. 10A and FIG. 10B illustrate states where a user grips an electronic device in the form of a third grip, according to an embodiment.
Figure 10B:
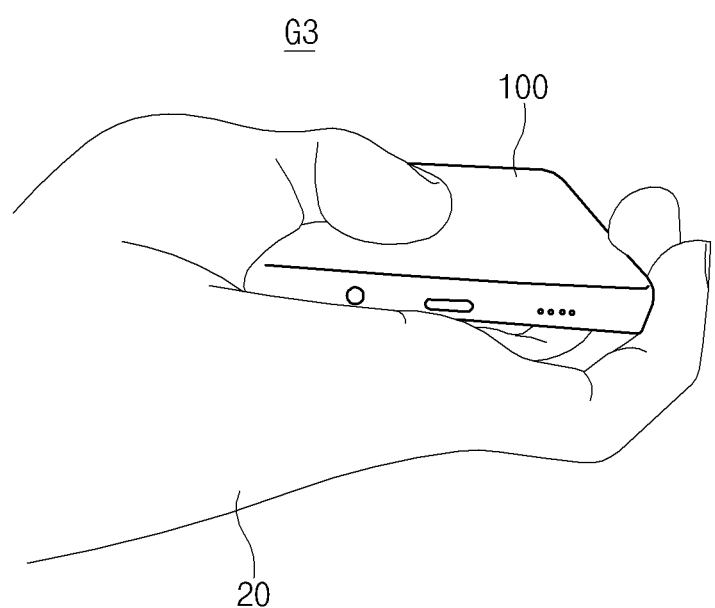

FIGS. 10A and 10B illustrate states where a user grips an electronic device in the form of a third grip, according to an embodiment. FIG. 10A illustrates a front surface of the electronic device 100 in the case where the user grips the electronic device 100 in the form of a third grip G3. FIG. 10B illustrates a bottom region of the electronic device 100 in the case where the user grips the electronic device 100 in the form of the third grip G3.

TABLE 2

| Direction | Grip | Indexes of first and second antennas (116-1, 116-2) | Indexes of antenna structure 130 | Sensing regions |
|---|---|---|---|---|
| Left hand | G1 | 4, 1 | 0 | A, B |
|  | G2 | 13, 1 | 0 | A, B, C, D |
|  | G3 | 4, 17 | 1 | B, C, D, E |
| Right hand | G1 | 12, 2 | 0 | B, C |
|  | G2 | 21, 1 | 1 | OPEN |
|  | G3 | 20, 5 | 0 | B, C, F |

Table 2 is a table showing the correspondence between the first grip G1 to the third grip G3 and indices of the first antenna 116-1 and the second antenna 116-2, indices of the antenna structure 130, and the sensing regions 610 to 660 are matched.

Referring to FIGS. 8A and 8B and Table 2, the electronic device 100 may measure impedances of the first antenna 116-1, the second antenna 116-2, and the antenna structure 130. Because the impedances measured from the first antenna 116-1 and the second antenna 116-2 respectively correspond to index 4 and index 1, the electronic device 100 may determine that the user grips the "A" region 610 and the "B" region 620 of the electronic device 100 in the form of the first grip G1. Also, because the impedance of the antenna structure 130 corresponds to index "0," the electronic device 100 may determine that the hand 20 of the user does not contact the region corresponding to the antenna structure 130.

Referring to FIGS. 9A and 9B and Table 2, the electronic device 100 may measure impedances of the first antenna 116-1, the second antenna 116-2, and the antenna structure 130. Because the impedances measured from the first antenna 116-1 and the second antenna 116-2 respectively correspond to index 13 and index 1, the electronic device 100 may determine that the user grips the "A" region 610, the "B" region 620, the "C" region 630, and the "D" region 640 of the electronic device 100 in the form of the second grip G2. Also, because the impedance of the antenna structure 130 corresponds to index "0," the electronic device 100 may determine that the hand 20 of the user does not contact the region corresponding to the antenna structure 130.

Referring to FIGS. 10A and 10B and Table 2, the electronic device 100 may measure impedances of the first antenna 116-1, the second antenna 116-2, and the antenna structure 130. Because the impedances measured from the first antenna 116-1 and the second antenna 116-2 respectively correspond to index 4 and index 17, the electronic device 100 may determine that the user grips the "B" region 620, the "C" region 630, the "D" region 640, and the "E" region 650 of the electronic device 100 in the form of the third grip G3. Also, because the impedance of the antenna structure 130 corresponds to index "1," the electronic device 100 may determine that the hand 20 of the user contacts the region corresponding to the antenna structure 130.

An electronic device according to an embodiment of the disclosure may include a housing, a first antenna included in a first region of the housing, a second antenna included in a second region of the housing, an antenna structure that is disposed within the housing and includes an antenna array, a coupler that obtains an impedance of each of the first antenna, the second antenna, and the antenna structure, a memory that stores a table in which the impedances of each of the first antenna, the second antenna, and the antenna structure are matched to a location or a contact of an external object, and a processor that is electrically connected to the coupler and the memory, and the processor may obtain the impedances of each of the first antenna, the second antenna, and the antenna structure from the coupler when the external object approaches the electronic device, obtain the location or the contact of the external object based on the obtained impedances and the table, and transceive a signal in a specified frequency band through the antenna structure in a direction where the external object is absent.

The signal in the specified frequency band according to an embodiment of the disclosure may be transceived through the antenna structure towards a base station.

The antenna array according to an embodiment of the disclosure may include at least one of a plurality of dipole antennas, a plurality of patch antennas, and a plurality of monopole antennas.

The specified frequency band according to an embodiment of the disclosure may range from 3.5 GHz to 100 GHz.

The housing according to an embodiment of the disclosure may include a cover glass, a back cover facing away from the cover glass, and a side member surrounding a space between the cover glass and the back cover, the first region of the housing may be a first region of the side member, and the second region of the housing may be a second region of the side member.

The electronic device according to an embodiment of the disclosure may further include a printed circuit board on which the memory and the processor are disposed, and the antenna structure may be interposed between the printed circuit board and the back cover.

The electronic device according to an embodiment of the disclosure may further include a first wireless communication circuitry that is electrically connected with the first antenna and the processor, and the processor may feed power to the first antenna through the first wireless communication circuitry.

The electronic device according to an embodiment of the disclosure may further include a second wireless communication circuitry that is electrically connected with the second antenna and the processor, and the processor may feed power to the second antenna through the second wireless communication circuitry.

The electronic device according to an embodiment of the disclosure may further include a third wireless communication circuitry that is electrically connected with the antenna structure and the processor, and the processor may feed power to the antenna structure through the third wireless communication circuitry.

The electronic device according to an embodiment of the disclosure may further include an additional antenna structure that is electrically connected with the processor, and when the external object contacts a region of the housing, which corresponds to the antenna structure, the processor may transmit/receive the signal in the specified frequency band through the additional antenna structure.

The specified frequency band used by the additional antenna structure according to an embodiment of the disclosure may range from 3.5 GHz to 100 GHz.

When the external object is absent from a region adjacent to the electronic device, the processor according to an embodiment of the disclosure may maintain a signal transmit/receive direction of the antenna structure without modification.

The coupler according to an embodiment of the disclosure may obtain the impedance of each of the first antenna, the second antenna, and the antenna structure, based on reflection signals reflected while signals are transmitted through the first antenna, the second antenna, and the antenna structure.

The processor according to an embodiment of the disclosure may obtain the location of the external object by comparing the impedances of each of the first antenna and the second antenna with the table.

The processor according to an embodiment of the disclosure may obtain the contact of the external object made on a region of the housing corresponding to the antenna structure, by comparing the impedance of the antenna structure with the table.

An electronic device according to an embodiment of the disclosure may include a housing, at least one antenna that is disposed at a portion of the housing, at least one antenna structure that is located within the housing and includes a plurality of antenna elements, a first wireless communication circuitry that is electrically connected with the at least one antenna, a second wireless communication circuitry that is electrically connected with the plurality of antenna elements and forms a directional beam by using the plurality of antenna elements, a processor that is operatively connected with the at least one antenna and the plurality of antenna elements, and a memory that is operatively connected with the processor, and the memory may store instructions that, when executed, cause the processor to measure impedances associated with the at least one antenna and the plurality of antenna elements while the first wireless communication circuitry and the second wireless communication circuitry are used, and to change a direction of the directional beam based at least partially on values of the measured impedances.

The first wireless communication circuitry according to an embodiment of the disclosure have a frequency range between 0.7 GHz and 3.5 GHz, and the second wireless communication circuitry according to an embodiment of the disclosure may have a frequency range between 3.5 GHz and 100 GHz.

The electronic device according to an embodiment of the disclosure may further include a feedback circuit that is electrically connected with the plurality of antennas, the at least one antenna structure, and the processor, and the instructions, when executed, may cause the processor to determine the values of the impedances based at least partially on a signal from the feedback circuit, to determine a location of an external object contacting or approaching the housing, based on the values of the impedances, and to determine the direction of the directional beam based at least partially on the location.

The at least one antenna structure device according to an embodiment of the disclosure may include a first antenna structure and a second antenna structure, and when an external object contacts a region of the housing, which corresponds to the first antenna structure, the processor may transmit/receive a signal in a specified frequency band through the second antenna structure.

The memory according to an embodiment of the disclosure may store a table where impedances of the at least one antenna and the at least one antenna structure are matched to a location and a contact of an external object, and the processor may obtain the location or the contact of the external object by comparing the values of the measured impedances with the table.

Figure 11:
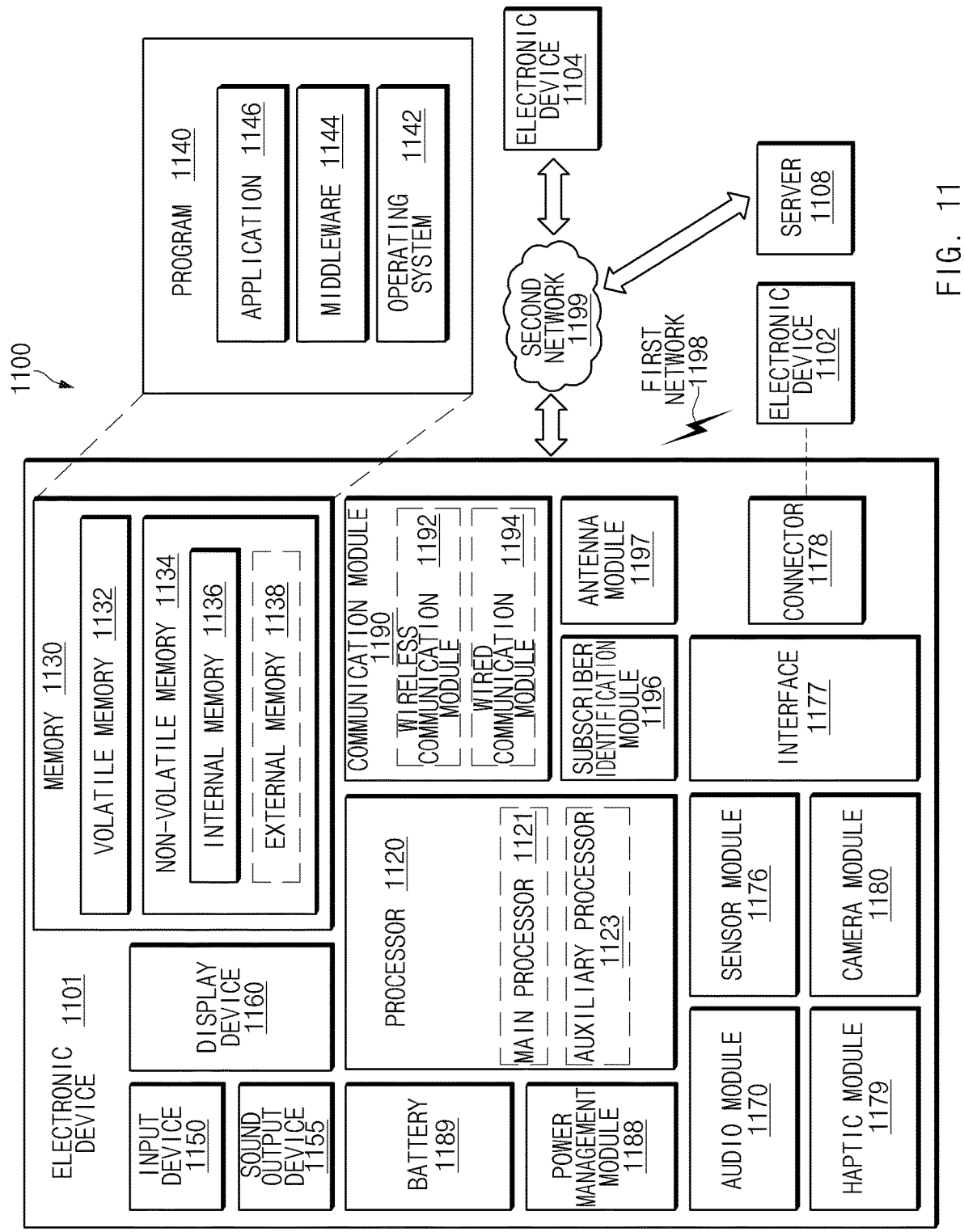
FIG. 11 is a block diagram illustrating an electronic device in a network environment according to various embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

Figure 12:
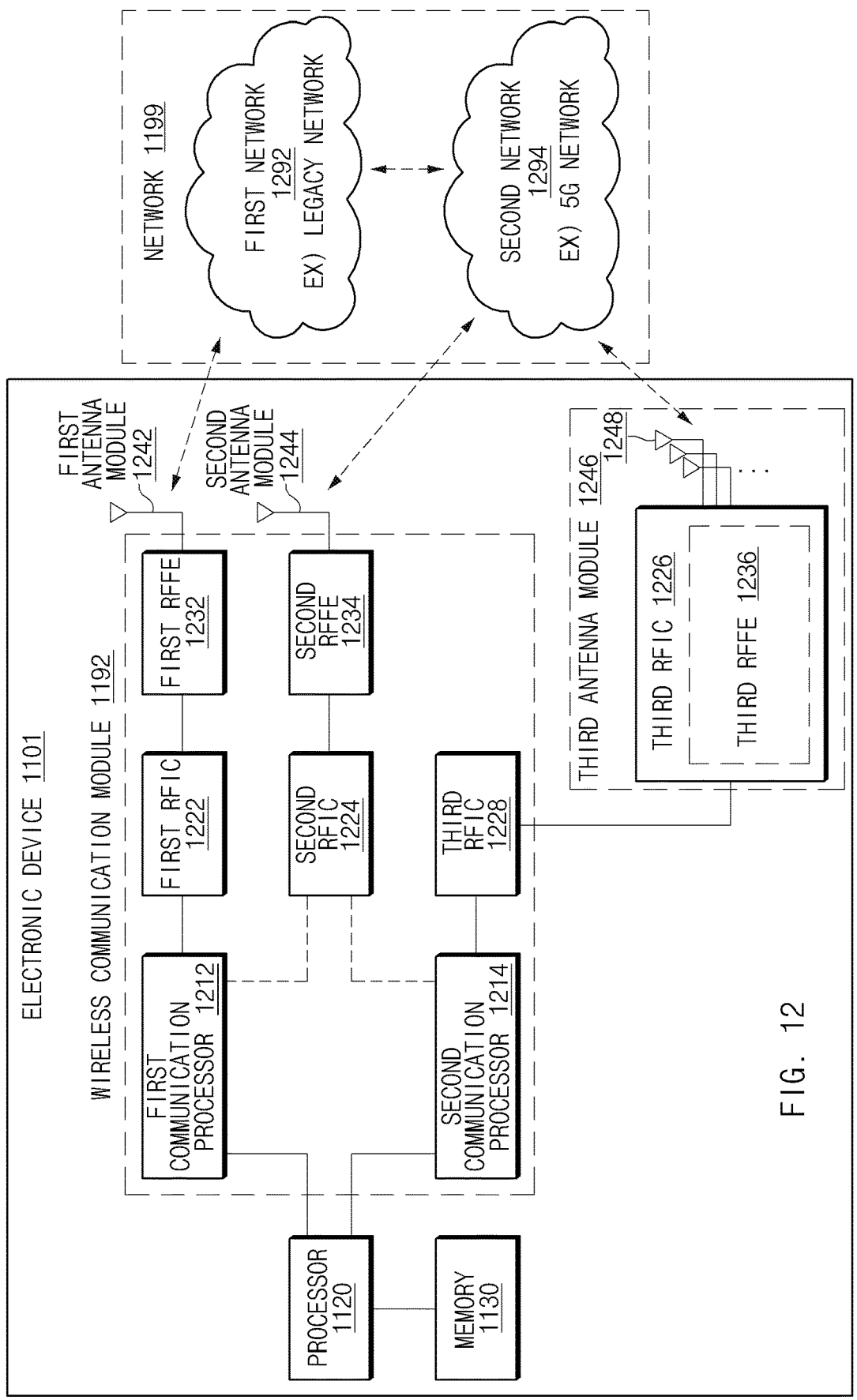
FIG. 12 is a block diagram of an electronic device for supporting legacy network communication and 5G network communication, according to an embodiment.

FIG. 12 is a block diagram of the electronic device 1101 (e.g., 100 of FIG. 1) for supporting legacy network communication and 5G network communication, according to an embodiment.

Referring to FIG. 12, the electronic device 1101 may include a first communication processor 1212, a second communication processor 1214, a first radio frequency integrated circuit (RFIC) 1222, a second RFIC 1224, a third RFIC 1226, a fourth RFIC 1228, a first radio frequency front end (REFE) 1232, a second REFE 1234, a first antenna module 1242, a second antenna module 1244, and an antenna 1248. The electronic device 1101 may further include the processor 1120 and the memory 1130. The network 1199 may include a first network 1292 and a second network 1294. According to another embodiment, the electronic device 1101 may further include at least one component of the components illustrated in FIG. 11, and the network 1199 may further include at least another network. According to an embodiment, the first communication processor 1212, the second communication processor 1214, the first RFIC 1222, the second RFIC 1224, the fourth RFIC 1228, the first REFE 1232, and the second REFE 1234 may form at least a portion of the wireless communication module 1192. According to another embodiment, the fourth RFIC 1228 may be omitted or may be included as a part of the third RFIC 1226.

The first communication processor 1212 may establish a communication channel in a particular band to be used for wireless communication with the first network 1292 and may support legacy network communication through the established communication channel. According to various embodiments, a first network 1291 may be a legacy network including a $2^{nd}$ generation (2G), 3G, 4G, or long term evolution (LTE) network. The second communication processor 1214 may establish a communication channel corresponding to a specified band (e.g., approximately 6 GHz to approximately 60 GHz) of bands to be used for wireless communication with a second network 1294 and may support 5G network communication through the established communication channel. According to an embodiment, the second network 1294 may be a 5G network defined in the 3GPP. Additionally, according to an embodiment, the first communication processor 1212 or the second communication processor 1214 may establish a communication channel corresponding to another specified band (e.g., approximately 6 GHz or lower) of the bands to be used for wireless communication with the second network 1294 and may support 5G network communication through the established communication channel. According to an embodiment, the first communication processor 1212 and the second communication processor 1214 may be implemented within a single chip or a single package. According to various embodiments, the first communication processor 1212 or the second communication processor 1214 may be implemented within a single chip or a single package together with the processor 1120, the auxiliary processor 1123, or the communication module 1190.

In the case of transmitting a signal, the first RFIC 1222 may convert a baseband signal generated by the first communication processor 1212 into a radio frequency (RF) signal of approximately 700 MHz to approximately 3 GHz that is used in the first network 1292 (e.g., a legacy network). In the case of receiving a signal, an RF signal may be obtained from the first network 1292 (e.g., a legacy network) through an antenna (e.g., the first antenna module 1242) and may be pre-processed through an REFE (e.g., the first REFE 1232). The first RFIC 1222 may convert the pre-processed RF signal into a baseband signal so as to be processed by the first communication processor 1212.

In the case of transmitting a signal, the second RFIC 1224 may convert a baseband signal generated by the first communication processor 1212 or the second communication processor 1214 into an RF signal (hereinafter referred to as a "5G Sub6 RF signal") in a Sub6 band (e.g., alternatively 6 GHz or lower) used in the second network (e.g., a 5G network). In the case of receiving a signal, the 5G Sub6 RF signal may be obtained from the second network 1294 (e.g., a 5G network) through an antenna (e.g., the second antenna module 1244) and may be pre-processed through an REFE (e.g., the second REFE 1234). The second RFIC 1224 may convert the pre-processed 5G Sub6 RF signal into a baseband signal so as to be processed by a communication processor corresponding to the 5G Sub6 RF signal from among the first communication processor 1212 or the second communication processor 1214.

The third RFIC 1226 may convert a baseband signal generated by the second communication processor 1214 into an RF signal (hereinafter referred to as a "5G Above6 RF signal") in a 5G Above6 band (e.g., approximately 6 GHz to approximately 60 GHz) to be used in the second network 1294 (e.g., a 5G network). In the case of receiving a signal, the 5G Above6 RF signal may be obtained from the second network 1294 (e.g., a 5G network) through an antenna (e.g., the antenna 1248) and may be pre-processed through a third REFE 1236. The third RFIC 1226 may convert the pre-processed 5G Above6 RF signal into a baseband signal so as to be processed by the second communication processor 1214. According to an embodiment, the third REFE 1236 may be implemented as a part of the third RFIC 1226.

According to an embodiment, the electronic device 1101 may include the fourth RFIC 1228 independently of the third RFIC 1226 or as at least a portion of the third RFIC 1226. In this case, the fourth RFIC 1228 may convert a baseband signal generated by the second communication processor 1214 into an RF signal (hereinafter referred to as an "IF signal") in an intermediate frequency band (e.g., approximately 9 GHz to approximately 11 GHz) and may provide the IF signal to the third RFIC 1226. The third RFIC 1226 may convert the IF signal into the 5G Above6 RF signal. In the case of receiving a signal, the 5G Above6 RF signal may be received from the second network 1294 (e.g., a 5G network) through an antenna (e.g., the antenna 1248) and may be converted into an IF signal by the third RFIC 1226. The fourth RFIC 1228 may convert the IF signal into a baseband signal so as to be processed by the second communication processor 1214.

According to an embodiment, the first RFIC 1222 and the second RFIC 1224 may be implemented with a part of a single chip or a single package. According to an embodiment, the first REFE 1232 and the second REFE 1234 may be implemented with a part of a single chip or a single package. According to an embodiment, at least one of the first antenna module 1242 or the second antenna module 1244 may be omitted or may be combined with any other antenna module to process RF signals in a plurality of bands.

According to an embodiment, the third RFIC 1226 and the antenna 1248 may be disposed at the same substrate to form a third antenna module 1246. For example, the wireless communication module 1192 or the processor 1120 may be disposed at a first substrate (e.g., a main PCB). In this case, the third RFIC 1226 may be disposed in a partial region (e.g., on a lower surface) of a second substrate (e.g., a sub PCB) independent of the first substrate, and the antenna 1248 may be disposed in another partial region (e.g., on an upper surface) of the second substrate. As such, the third antenna module 1246 may be formed. According to an embodiment, the antenna 1248 may include, for example, an antenna array to be used for beamforming. As the third RFIC 1226 and the antenna 1248 are disposed at the same substrate, it may be possible to decrease a length of a transmission line between the third RFIC 1226 and the antenna 1248. The decrease in the transmission line may make it possible to reduce the loss (or attenuation) of a signal in a high-frequency band (e.g., approximately 6 GHz to approximately 60 GHz) used for the 5G network communication due to the transmission line. As such, the electronic device 1101 may improve the quality or speed of communication with the second network 1294 (e.g., a 5G network).

The second network 1294 (e.g., a 5G network) may be used independently of the first network 1292 (e.g., a legacy network) (e.g., stand-alone (SA)) or may be used in conjunction with the first network 592 (e.g., non-standalone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 1101 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 1130 so as to be accessed by any other component (e.g., the processor 1120, the first communication processor 1212, or the second communication processor 1214).

FIGS. 13A to 13C illustrate an embodiment of a structure of a third antenna module described with reference to FIG. 12, for example. FIG. 13A is a perspective view of the third antenna module 1246 when viewed from one side, and FIG. 13B is a perspective view of the third antenna module 1246 when viewed from another side. FIG. 13C is a cross-sectional view of the third antenna module 1246 taken along a line A-A'.

Referring to FIGS. 13A to 13C, in an embodiment, the third antenna module 1246 may include a printed circuit board 1310, an antenna array 1330, a radio frequency integrated circuit (RFIC) 1352, a power manage integrated circuit (PMIC) 1354, and a module interface (not shown). In one embodiment, the third antenna module 1246 may further include a shielding member 1390. In other embodiments, at least one of the above components may be omitted, or at least two of the components may be integrally formed.

The printed circuit board 1310 may include a plurality of conductive layers and a plurality of non-conductive layers, and the conductive layers and the non-conductive layers may be alternately stacked. The printed circuit board 1310 may provide electrical connection with various electronic components disposed on the printed circuit board 1310 or other external components, by using wires and conductive vias formed in the conductive layers.

The antenna array 1330 (e.g., 1248 of FIG. 12) may include a plurality of antenna elements 1332, 1334, 1336, and 1338 configured to be able to form a directional beam. The antenna elements 1332, 1334, 1336, and 1338 may be formed on a first surface of the printed circuit board 1310 as illustrated. According to another embodiment, the antenna array 1330 may be formed within the printed circuit board 1310. According to certain embodiments, the antenna array 1330 may include a plurality of antenna arrays (e.g., a dipole antenna array and/or a patch antenna array), the shapes or kinds of which may be identical or different.

The RFIC 1352 (e.g., 1226 of FIG. 12) may be disposed on another region (e.g., a second surface facing away from the first surface) of the printed circuit board 1310 so as to be spaced from the antenna array 1330. The RFIC 1352 may be configured to process signals in a selected frequency band, which are then transmitted/received through the antenna array 1330. According to an embodiment, in the case of transmitting a signal, the RFIC 1352 may convert a baseband signal obtained from a communication processor (not illustrated) into an RF signal. In the case of receiving a signal, the RFIC 1352 may convert an RF signal received through the antenna array 1330 into a baseband signal and may provide the baseband signal to the communication processor.

According to another embodiment, in the case of transmitting a signal, the RFIC 1352 may up-convert an IF signal (e.g., approximately 9 GHz to approximately 11 GHz) obtained from an intermediate frequency integrated circuit (IFIC) (e.g., 1228 of FIG. 12) into an RF signal. In the case of receiving a signal, the RFIC 1352 may down-convert an RF signal obtained through the antenna array 1330 into an IF signal and may provide the IF signal to the IFIC.

The PMIC 1354 may be disposed on the other region (e.g., the second surface) of the printed circuit board 1310, which is spaced from the antenna array 1330. The PMIC 1354 may be supplied with a voltage from a main PCB (not illustrated) and may provide the power necessary for various components (e.g., the RFIC 1352) on the antenna module.

The shielding member 1390 may be disposed at a portion (e.g., on the second surface) of the printed circuit board 1310 such that at least one of the RFIC 1352 or the PMIC 1354 is electromagnetically shielded. According to an embodiment, the shielding member 1390 may be a shield can.

Although not illustrated in drawings, in certain embodiments, the third antenna module 1246 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 1352 and/or the PMIC 1354 of the third antenna module 1246 may be electrically connected with the printed circuit board through the connection member.

Figure 14:
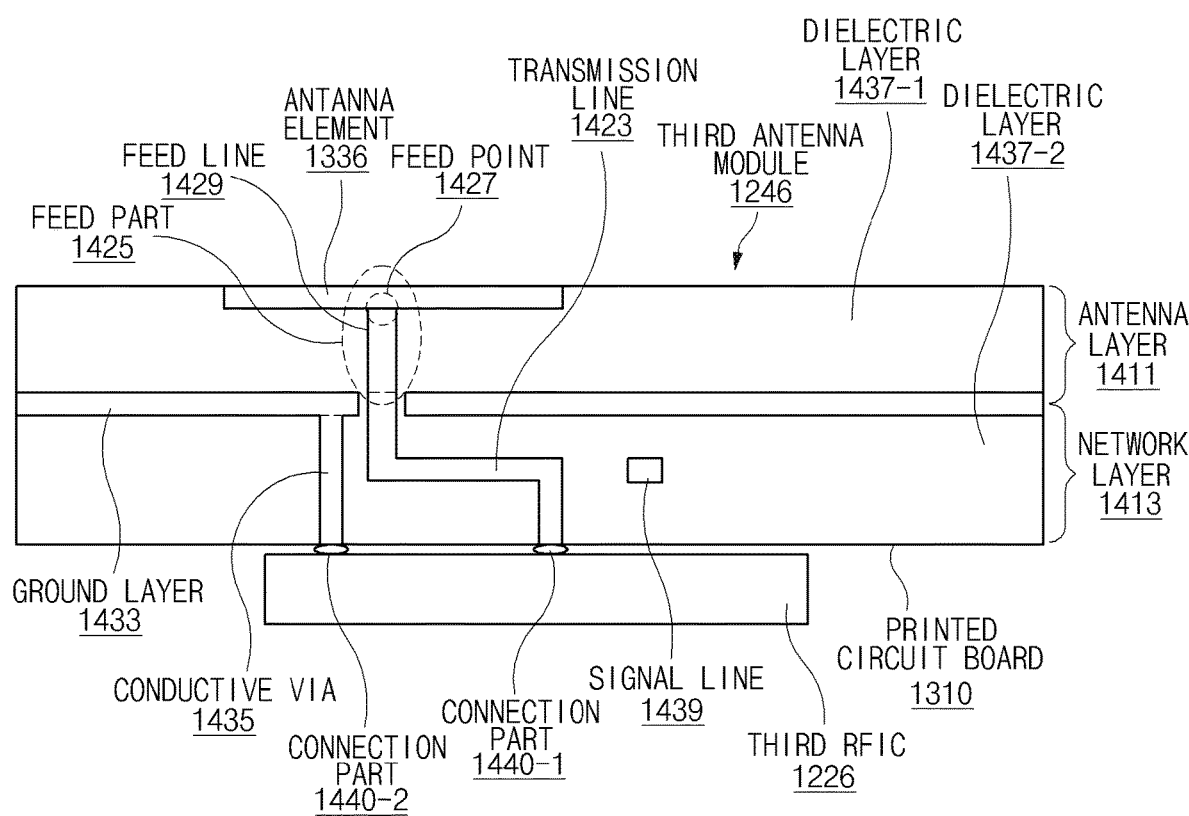
FIG. 14 illustrates a cross-sectional view of a third antenna module taken along a line A-A' of FIG. 13A.

FIG. 14 illustrates a cross-sectional view of a third antenna module taken along a line A-A' of FIG. 13A. In an embodiment illustrated, the printed circuit board 1310 may include an antenna layer 1411 and a network layer 1413.

The antenna layer 1411 may include at least one dielectric layer 1437-1, and an antenna element 1336 and/or a feed part 1425 formed on an outer surface of the dielectric layer 1437-1 or therein. The feed part 1425 may include a feed point 1427 and/or a feed line 1429.

The network layer 1413 may include at least one dielectric layer 1437-2; and at least one ground layer 1433, at least one conductive via 1435, a transmission line 1423, and/or a signal line 1439 formed on an outer surface of the dielectric layer 1437-2 or therein.

In addition, in the embodiment illustrated, the third RFIC 1226 of FIG. 13C may be electrically connected with the network layer 1413, for example, through first and second connection parts (e.g., solder bumps) 1440-1 and 1440-2. In other various embodiments, various connection structures (e.g., soldering or a ball grid array (BGA)) may be utilized instead of the connection parts 1440-1 and 1440-2. The third RFIC 1226 may be electrically connected with the antenna element 1336 through the first connection part 1440-1, the transmission line 1423, and the feed part 1425. Also, the third RFIC 1226 may be electrically connected with the ground layer 1433 through the second connection part 1440-2 and the conductive via 1435. Although not illustrated, the third RFIC 1226 may also be electrically connected with the above module interface through the signal line 1439.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to certain embodiments of the disclosure, radiation performance of an antenna structure may be improved by sensing location and contact of an external object approaching an electronic device.

In addition, various other effects and advantages directly or indirectly understood through the disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a first antenna included in a first region of the housing;
a second antenna included in a second region of the housing;
an antenna structure disposed within the housing and including an antenna array;
a coupler configured to obtain an impedance of each of the first antenna, the second antenna, and the antenna structure;
a memory configured to store a table in which the impedances of each of the first antenna, the second antenna, and the antenna structure are matched to a location or a contact of an external object; and
a processor electrically connected to the coupler and the memory, wherein the processor is configured to:
 obtain the impedances of each of the first antenna, the second antenna, and the antenna structure from the coupler when the external object approaches the electronic device;
 obtain the location or the contact of the external object based on the obtained impedances and the table; and
 transceive a signal in a specified frequency band through the antenna structure in a direction where the external object is absent,
wherein the specified frequency band ranges from 3.5 GHz to 100 GHz, and
wherein the housing includes a cover glass, a back cover facing away from the cover glass, and a side member surrounding a space between the cover glass and the back cover,
wherein the first region of the housing is a first region of the side member, and
wherein the second region of the housing is a second region of the side member.

2. The electronic device of claim 1, wherein the signal in the specified frequency band is transceived through the antenna structure towards a base station.

3. The electronic device of claim 1, wherein the antenna array includes a plurality of dipole antennas, a plurality of patch antennas, and/or a plurality of monopole antennas.

4. The electronic device of claim 1, further comprising:
a printed circuit board on which the memory and the processor are disposed,
wherein the antenna structure is interposed between the printed circuit board and the back cover.

5. The electronic device of claim 1, further comprising:
a first wireless communication circuitry electrically connected with the first antenna and the processor, and
wherein the processor is configured to feed power to the first antenna through the first wireless communication circuitry.

6. The electronic device of claim 1, further comprising:
a second wireless communication circuitry electrically connected with the second antenna and the processor, and
wherein the processor is configured to feed power to the second antenna through the second wireless communication circuitry.

7. The electronic device of claim 1, further comprising:
a third wireless communication circuitry electrically connected with the antenna structure and the processor, and
wherein the processor is configured to feed power to the antenna structure through the third wireless communication circuitry.

8. The electronic device of claim 1, further comprising:
an additional antenna structure electrically connected with the processor,
wherein, when the external object contacts a region of the housing, which corresponds to the antenna structure, the processor is further configured to transceive the signal in the specified frequency band through the additional antenna structure.

9. The electronic device of claim 1, wherein, when the external object is absent from a region adjacent to the electronic device, the processor is further configured to maintain a signal transmit/receive direction of the antenna structure without modification.

10. The electronic device of claim 1, wherein the coupler obtains the impedances of each of the first antenna, the second antenna, and the antenna structure based on reflection signals reflected while signals are transmitted through the first antenna, the second antenna, and the antenna structure.

11. The electronic device of claim 1, wherein the processor is further configured to obtain the location of the external object by comparing the impedances of each of the first antenna and the second antenna with the table.

12. The electronic device of claim 1, wherein the processor is further configured to obtain the contact of the external object made on a region of the housing corresponding to the antenna structure, by comparing the impedance of the antenna structure with the table.

* * * * *